(12) United States Patent
Tsuchiya et al.

(10) Patent No.: US 11,747,183 B2
(45) Date of Patent: Sep. 5, 2023

(54) AIR FLOW RATE MEASUREMENT DEVICE

(71) Applicant: DENSO CORPORATION, Kariya (JP)

(72) Inventors: Takuma Tsuchiya, Kariya (JP);
Akiyuki Sudou, Kariya (JP)

(73) Assignee: DENSO CORPORATION, Kariya (JP)

( * ) Notice: Subject to any disclaimer, the term of this patent is extended or adjusted under 35 U.S.C. 154(b) by 240 days.

(21) Appl. No.: 17/374,202

(22) Filed: Jul. 13, 2021

(65) Prior Publication Data

US 2021/0341324 A1  Nov. 4, 2021

Related U.S. Application Data

(63) Continuation of application No. PCT/JP2019/046577, filed on Nov. 28, 2019.

(30) Foreign Application Priority Data

Jan. 15, 2019  (JP) ................. 2019-004625

(51) Int. Cl.
*G01F 1/684* (2006.01)
*G01F 5/00* (2006.01)
*B29C 33/00* (2006.01)
*B29C 45/00* (2006.01)
*B29C 65/00* (2006.01)

(52) U.S. Cl.
CPC .......... *G01F 1/6842* (2013.01); *B29C 33/005* (2013.01); *G01F 5/00* (2013.01); *B29C 45/0025* (2013.01); *B29C 66/306* (2013.01); *B29C 66/328* (2013.01); *B29C 2045/0034* (2013.01)

(58) Field of Classification Search
CPC ....... G01F 1/6842; G01F 5/00; B29C 33/005; B29C 45/0025; B29C 66/306; B29C 66/328; B29C 2045/0034
See application file for complete search history.

(56) References Cited

U.S. PATENT DOCUMENTS

| | | | |
|---|---|---|---|
| 9,752,908 B2* | 9/2017 | Tashiro | ................. G01F 1/6842 |
| 11,326,918 B2* | 5/2022 | Ueda | ..................... G01F 1/6842 |
| 2013/0019675 A1 | 1/2013 | Ban et al. | |

FOREIGN PATENT DOCUMENTS

| | | | |
|---|---|---|---|
| JP | 2010-085136 | | 4/2010 |
| JP | 6114673 B2 * | | 3/2017 |
| JP | 2018-124099 | | 8/2018 |
| JP | 2018-179613 | | 11/2018 |
| WO | WO-2019156046 A1 * | 8/2019 | ............. G01F 1/684 |

* cited by examiner

*Primary Examiner* — Ryan D Walsh
(74) *Attorney, Agent, or Firm* — Nixon & Vanderhye P.C.

(57) ABSTRACT

A housing has a front surface, a rear surface, and side surface connecting the front surface with the rear surface. The housing is formed by injection molding. A first sub-passage is formed in the housing and communicates a first sub-passage inlet formed in the front surface with a first sub-passage outlet formed in the rear surface. A second sub-passage is formed in the housing and communicates a second sub-passage inlet formed in a midway portion of the first sub-passage with a second sub-passage outlet at a position different from the first sub-passage outlet. A flow rate detection unit is provided in the second sub-passage. A mold parting mark is formed in the rear surface of the housing at a position away from an inner opening edge of the first sub-passage outlet.

5 Claims, 21 Drawing Sheets

AIR FLOW RATE MEASUREMENT DEVICE

CROSS REFERENCE TO RELATED APPLICATION

The present application is a continuation application of International Patent Application No. PCT/JP2019/046577 filed on Nov. 28, 2019, which designated the U.S. and claims the benefit of priority from Japanese Patent Application No. 2019-4625 filed on Jan. 15, 2019. The entire disclosures of all of the above applications are incorporated herein by reference.

TECHNICAL FIELD

The present disclosure relates to an air flow rate measurement device.

BACKGROUND

Conventionally, an air flow rate measurement device is installed in a main passage through which air flows to measure a flow rate of air flowing through the main passage.

SUMMARY

According to an aspect of the present disclosure, an air flow rate measurement device is to be installed in a main passage that is configured to cause air to flow therethrough. The air flow rate measurement device comprises: a housing having a front surface on an upstream side of the main passage, a rear surface on a downstream side of the main passage, and a side surface connecting the front surface with the rear surface, the housing formed by injection molding; a first sub-passage formed in the housing, the first sub-passage communicating a first sub-passage inlet, which is formed in the front surface, with a first sub-passage outlet, which is formed in the rear surface; a second sub-passage formed in the housing, the second sub-passage communicating a second sub-passage inlet, which is formed in a midway portion of the first sub-passage, with a second sub-passage outlet, which is formed at a position different from the first sub-passage outlet; a flow rate detection unit provided in the second sub-passage and configured to output a signal according to a flow rate of air flowing through the second sub-passage; and a mold parting mark formed in the rear surface of the housing at a position that is away from an inner opening edge of the first sub-passage outlet.

DETAILED DESCRIPTION

Figure 1:
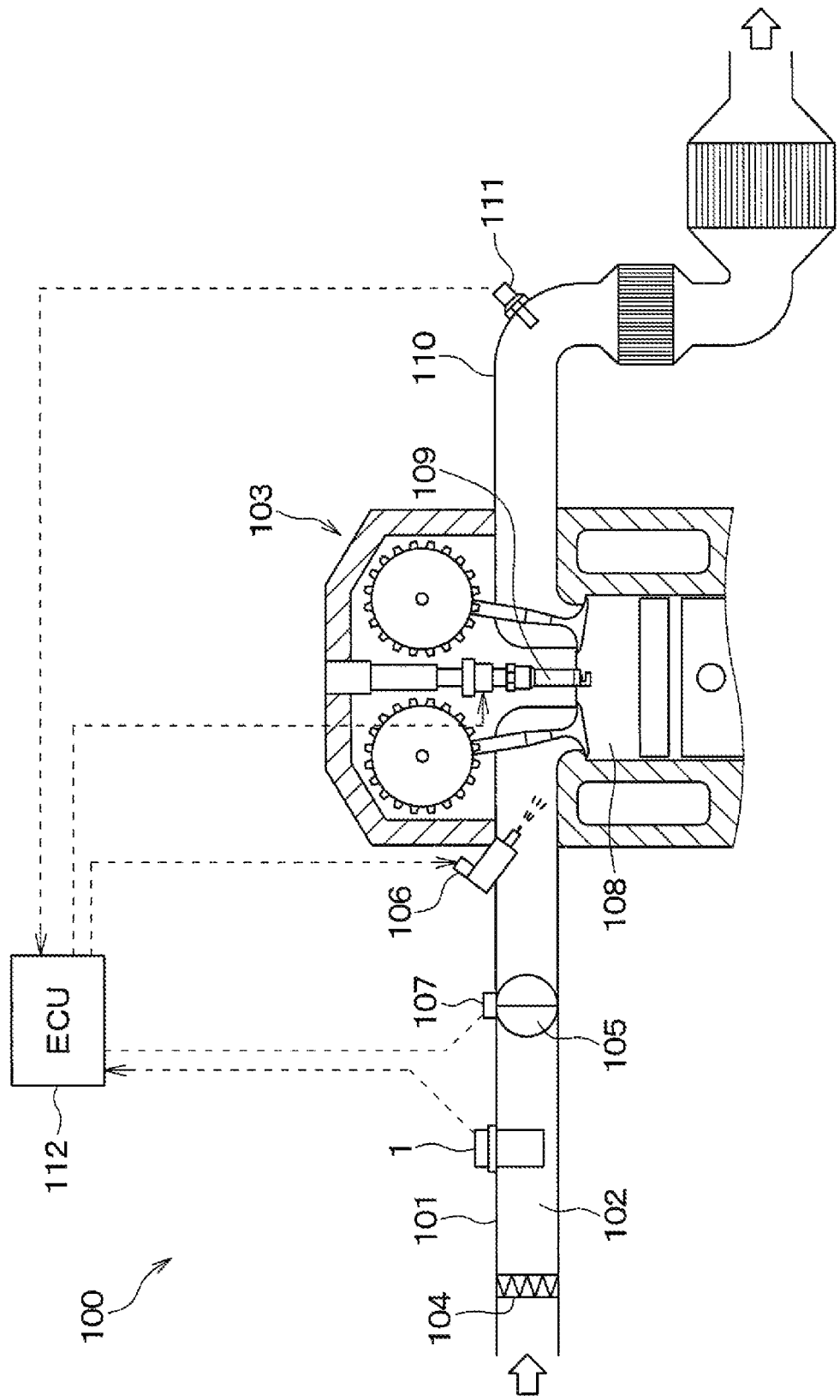
FIG. 1 is a configuration diagram showing a vehicle engine provided with an air flow meter according to a first embodiment.

Hereinafter, examples of the present disclosure will be described.

According to an example of the present disclosure, an air flow rate measurement device is installed in a main passage through which air flows to measure a flow rate of air flowing through the main passage.

According to an example of the present disclosure, an air flow rate measurement device is installed in an intake passage that is a main flow passage formed inside an intake pipe of an engine. A housing of this air flow rate measurement device has a front surface arranged on the upstream side of the main passage, a rear surface arranged on the downstream side of the main passage, and a side surface connecting the front surface with the rear surface. A first sub-passage and a second sub-passage are formed inside the housing. The first sub-passage is referred to as a bypass flow passage, and the second sub-passage is referred to as a sub-bypass flow passage.

The first sub-passage communicates a first sub-passage inlet in the front surface of the housing with a first sub-passage outlet in the rear surface of the housing. The second sub-passage communicates a second sub-passage inlet in a midway portion of the first sub-passage with a second sub-passage outlet in the side surface of the housing. A flow rate detection unit that outputs a signal according to a flow rate of air flowing through the second sub-passage is provided in a midway portion of the second sub-passage.

With this configuration, this air flow rate measurement device is configured to discharge dust contained in the air flowing from the first sub-passage inlet to the first sub-passage through the first sub-passage outlet by inertial force and cause dust-free air to flow through the second sub-passage, thereby to restrict dust from adhering to the air flow rate measurement unit.

Further, in this air flow rate measurement device, the inner wall surface of the first sub-passage on the flow rate detection unit side is curved so as to extend from the upstream side to the downstream side and to be away from the second sub-passage inlet. In addition, a portion of the inner wall of the first sub-passage, which is on the flow rate detection unit side and on the upstream side of the second sub-passage inlet, is farther from the flow rate detector than a portion of the inner wall of the first sub-passage, which is on the flow rate detection unit side and on the downstream of the second sub-passage inlet. With this configuration, this air flow rate measurement device restricts dust from entering the second sub-passage even when the dust contained in the air flowing through the first sub-passage collides with the inner wall surface of the first sub-passage and bounces off.

The housing of the air flow rate measurement device is formed by injection molding. At that time, in a case where a parting portion (that is, parting line) of an injection molding die is located on the rear surface of the housing or the like, a parting mark of the molding die is formed at that portion.

As a result of investigation of the inventors about the position of the parting mark formed on the housing, the following has been found.

The parting mark formed on the housing appears as a small mark when the molding die is in its initial state. However, when the molding die is used for a long period of time, and a gap is formed in the parting portion of the molding die due to aging or the like, burrs may occur in the parting portion of the molding die. If a burr is formed in the parting mark on the rear surface of the housing, and the burr is deformed so as to fall toward the first sub-passage outlet, the burr may protrude to the first sub-passage outlet. In that case, the air flow at the first sub-passage outlet is obstructed. Consequently, a concern arises that dust flowing through the first sub-passage is bounced into the first sub-passage due to the burr to intrude into the second sub-passage from the second sub-passage inlet. Here, in the second sub-passage, air flows from the second sub-passage inlet to the second sub-passage outlet through the flow rate detection unit. Therefore, it is conceivable that the dust that has entered the second sub-passage from the second sub-passage inlet moves toward the flow rate detection unit together with the air flow in the second sub-passage and adheres to the flow rate detection unit. If dust adheres to the flow rate detection unit, an error may occur in the output signal of the flow rate detection unit, and a detection accuracy of the air flow rate measurement device that detects the air flow rate may deteriorate. In this way, in the configuration in which the housing of the air flow rate measurement device has the first sub-passage and the second sub-passage, it has been found by the inventors' investigation that the position of the parting mark formed on the housing may greatly affect the detection accuracy of the air flow rate.

According to an aspect of the present disclosure, an air flow rate measurement device to be installed in a main passage through which air flows comprises: a housing that has a front surface on a upstream side of the main passage, a rear surface on a downstream side of the main passage, and a side surfaces connecting the front surface with the rear surface and. The housing is formed by injection molding; a first sub-passage that is formed in the housing and that communicates the first sub-passage inlet in the front surface with the first sub-passage outlet in the rear surface; a second sub-passage that communicating the second sub-passage inlet formed in a midway portion of the first sub-passage with the second sub-passage outlet formed at a position different from that of the first sub-passage outlet; a flow rate detection unit provided in the second sub-passage and configured to output a signal according to the flow rate of air flowing through the second sub-passage; and a mold parting mark on the rear surface of the housing at a position away from an inner opening edge of the first sub-passage outlet.

With this configuration, the mold parting mark, which is a mark of the parting portion of the injection molding dies, is formed in the rear surface of the housing at a position away from the inner opening edge of the first sub-passage outlet. Therefore, even in a case where the burr is formed on the mold division mark in the rear surface of the housing due to aging of the molding dies and for injection molding and where the burr is deformed toward the first sub-passage outlet, the burr is restricted from protruding to the first sub-passage outlet. Therefore, dust flowing through the first sub-passage and discharged from the first sub-passage outlet is not bounced back into the first sub-passage by the burr, thereby to restrict the dust from intruding into the second sub-passage. Therefore, it is possible to restrict dust from adhering to the flow rate detection unit provided in the second sub-passage. As described above, the air flow rate measurement device is configured to restrict deterioration of the detection accuracy of the air flow rate and to improve a reliability of the detection accuracy even in a case where the burr is formed on the mold division mark in the rear surface of the housing.

In the present description, the mold partition mark represents a place where a part where the mold partition portion is at the time of injection molding appears as a mark on the housing surface. The inner opening edge of the first sub-passage outlet represents the inner edge of the opening of the first sub-passage outlet formed in the housing. The inner opening edge of the first sub-passage inlet represents the inner edge of the opening of the first sub-passage inlet formed in the housing.

In the present description, the upstream side represents the upstream side of the air flow, and the downstream side represents the downstream side of the air flow. A reference numeral in parentheses attached to each configuration element or the like indicates an example of correspondence between the configuration element or the like and the specific configuration element or the like described in embodiments below.

Embodiments of the present disclosure will now be described with reference to the drawings. In the following embodiments, the same or equivalent parts are denoted by the same reference numerals as each other, and explanations will be provided to the same reference numerals. In the following description, when terms of upper, lower, left, right and vertical are used, those terms are used for convenience of explanation and do not limit the position and the orientation when the air flow rate measurement device is mounted on the vehicle are used.

First Embodiment

A first embodiment will be described with reference to the drawings. As shown in FIG. 1, an air flow rate measurement device of the present embodiment is an air flow meter 1 provided in an intake pipe 101 constituting an intake system of a vehicle engine system 100. Specifically, the air flow meter 1 is attached such that a part of the air flow meter 1 is inserted into an intake passage 102 as a main passage formed inside the intake pipe 101. The air flow meter 1 measures a flow rate of air (that is, an amount of intake air) drawn into an internal combustion engine 103.

First, a general configuration of the vehicle engine system 100 to which the air flow meter 1 is attached will be described.

In addition to the air flow meter 1, the intake pipe 101 is provided with an air cleaner 104, a throttle valve 105, an injector 106, and the like. The air cleaner 104 removes dust contained in the air flowing through the intake passage 102. The air flow meter 1 is attached to the downstream side of the air cleaner 104. The air supplied to the air flow meter 1 may contain fine dust that has passed through the air cleaner 104.

The throttle valve 105 is provided on the downstream side of the air flow meter 1 and controls the amount of intake air. An opening degree of the throttle valve 105 is detected by a throttle sensor 107. The injector 106 injects and supplies fuel to a combustion chamber 108 of the internal combustion engine 103.

Air-fuel mixture supplied to the combustion chamber is ignited by a spark plug 109 and is burned. Exhaust gas burned in the combustion chamber 108 is discharged to the outside of the vehicle through an exhaust pipe 110. The exhaust pipe 110 is provided with an exhaust sensor 111 such as an O2 sensor and an NF sensor.

Information measured by vehicle-mounted sensors such as the air flow meter 1 and the exhaust sensor 111 is transmitted to an electronic control device (hereinafter referred to as an ECU 112) of the vehicle engine system 100. The ECU 112 includes a microcomputer including a storage unit such as a processor, a ROM, and a RAM, and peripheral circuits thereof. Based on the information, the ECU 112 performs a control of each part of the vehicle engine system 100, such as a control of the fuel injection amount by the injector 106 and a control of an EGR amount.

Next, a configuration of the air flow meter 1 will be described.

Figure 2:
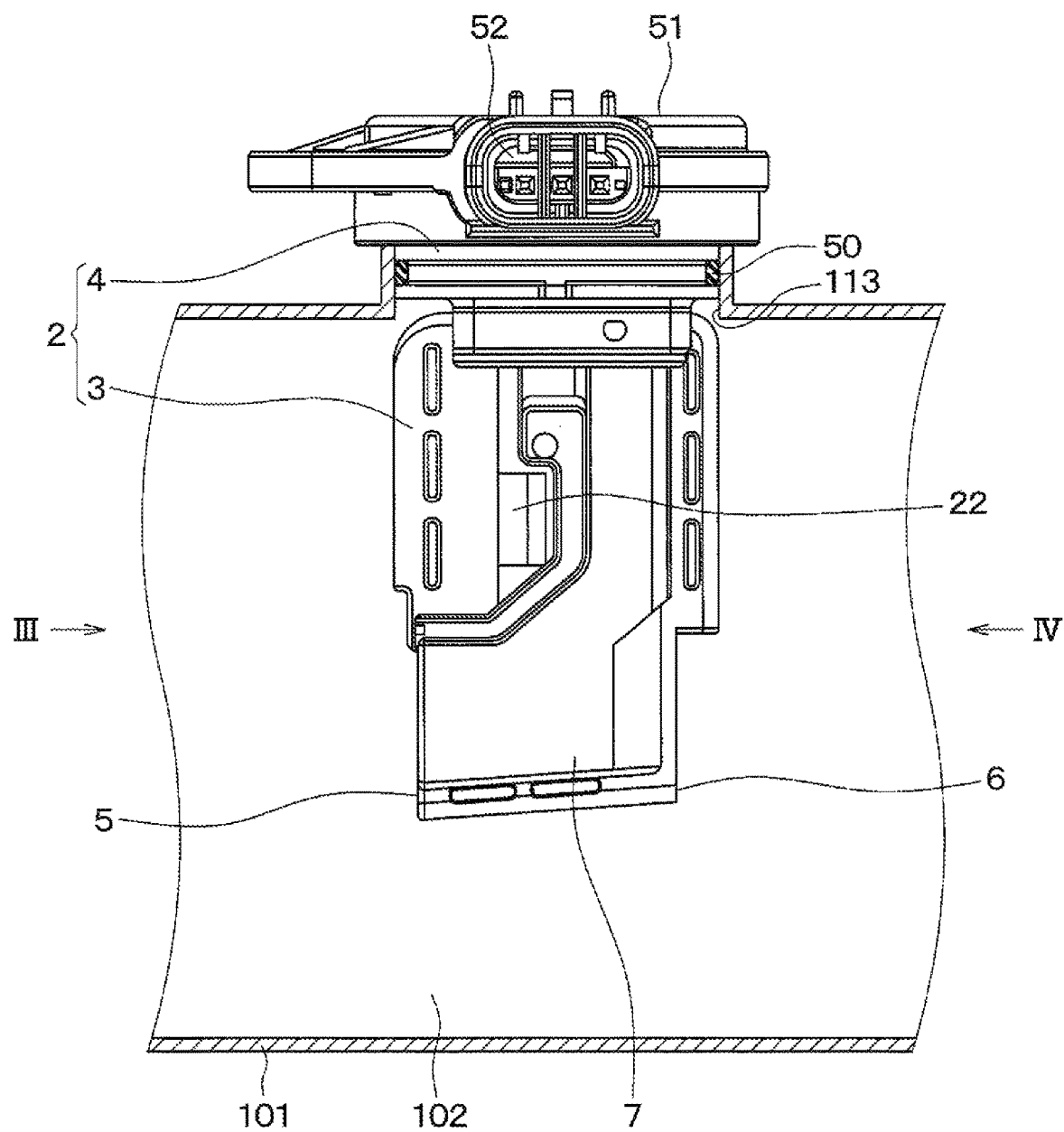
FIG. 2 is a cross-sectional view showing the air flow meter in a state in which the air flow meter is attached to an intake pipe.
Figure 3:
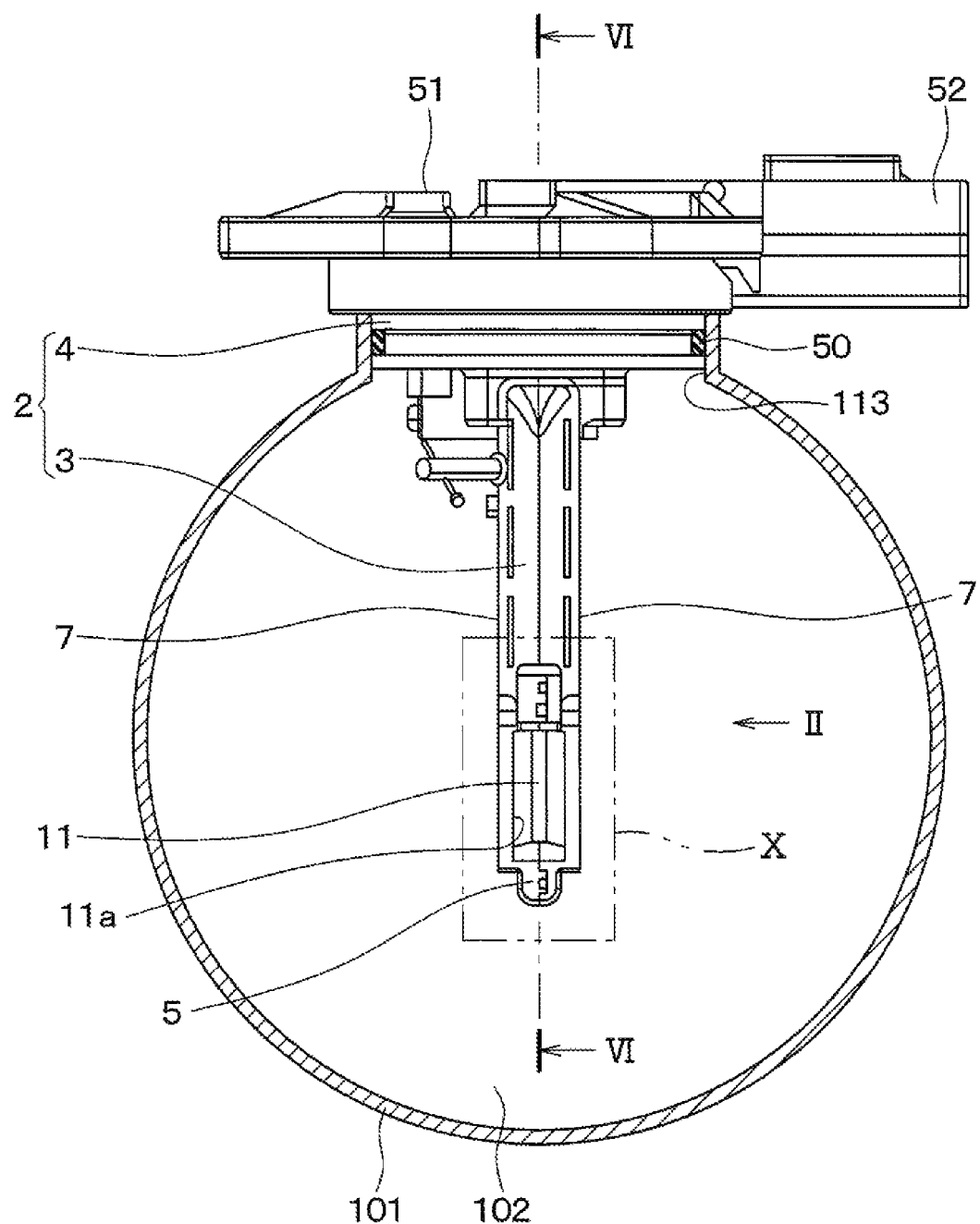
FIG. 3 is a cross-sectional view showing an intake pipe and a front view showing the air flow meter when viewed along the direction III in FIG. 2.
Figure 4:
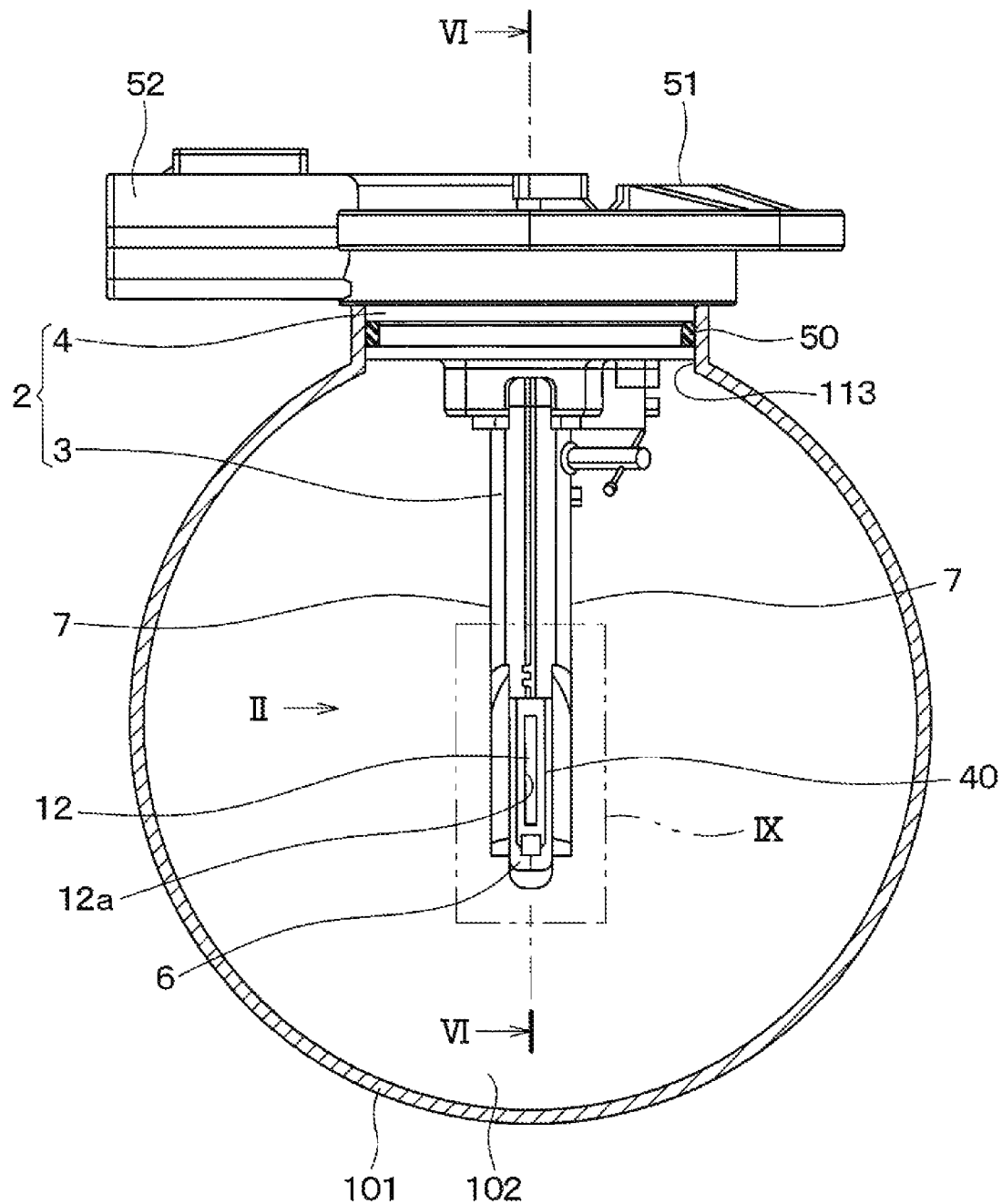
FIG. 4 is a cross-sectional view showing the intake pipe and a rear view showing the air flow meter when viewed along the direction IV in FIG. 2.

As shown in FIGS. 2 to 5, the air flow meter 1 includes a housing 2, a first sub-passage 10 and a second sub-passage 20 formed inside the housing 2, a flow rate detection unit 30 provided in the second sub-passage 20 and the like. Further, as shown in FIG. 4, the air flow meter 1 has a mold parting mark 40 formed at a position where a mold parting portion (that is, a parting line) resides at the time of injection molding of the housing 2.

As shown in FIGS. 2 to 4, the housing 2 is attached to a tubular hole portion 113 formed in the intake pipe 101. The housing 2 has a bypass portion 3 that is inserted in the intake passage 102 and a holding portion 4 that holds the bypass portion 3 and is fixed to the hole portion 113 of the intake pipe 101. The bypass portion 3 is formed in a plate shape having a predetermined thickness. The bypass portion 3 has a front surface 5 arranged on the upstream side of the intake passage 102, a rear surface 6 arranged on the downstream side of the intake passage 102, and side surfaces 7 connecting the front surface 5 with the rear surface 6. The front surface 5 and the rear surface 6 may have a curved shape capable of reducing air resistance or may have a flat shape.

Figure 5:
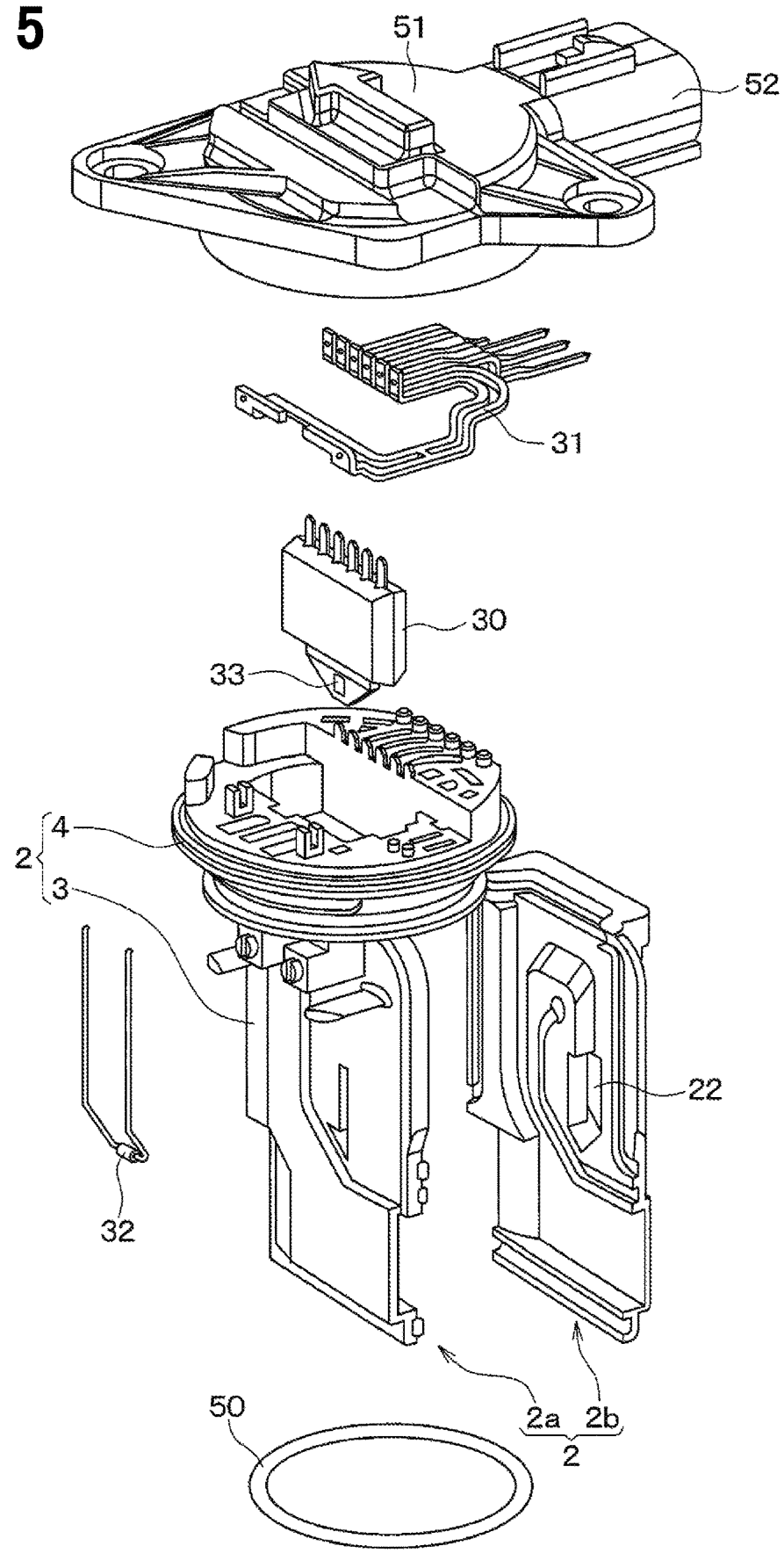
FIG. 5 is an exploded perspective view showing the air flow meter.

The holding portion 4 is formed in a disk shape. A part of the holding portion 4 on the side of the bypass portion 3 is fitted to the hole portion 113 of the intake pipe 101. A part of the holding portion 4 on the opposite side of the bypass portion 3 is placed outside the intake pipe 101. An O-ring 50 is provided between the inner wall of the hole portion 113 of the intake pipe 101 and the holding portion 4. As shown in FIG. 5, the flow rate detection unit 30 and a terminal 31 as a wiring member are housed inside the holding portion 4. The terminal 31 is electrically connected to the flow rate detection unit 30 and a temperature sensor 32. The temperature sensor 32 is provided inside the intake passage 102 and is outside the housing 2.

A lid member 51 is provided to the holding portion 4. The lid member 51 has a connector 52. Information measured by the flow rate detection unit 30 and the temperature sensor 32 is transmitted to the ECU 112 through a wiring on the vehicle side (not shown) connected to the connector 52.

As shown in FIG. 5, in the present embodiment, the housing 2 includes a first housing member 2a and a second housing member 2b. The first housing member 2a is a member in a shape obtained by cutting the bypass portion 3 at a position substantially half in the thickness direction. The first housing member 2a is integrally formed with the holding portion 4. The second housing member 2b is a member in a shape in which the bypass portion 3 is cut at a position substantially half in the thickness direction. By constructing the housing 2 with the first housing member 2a and the second housing member 2b in this way, the first sub-passage 10 and the second sub-passage 20 are formed inside the housing 2, and it is possible to reduce the number of components to be used for the housing 2.

Figure 6:
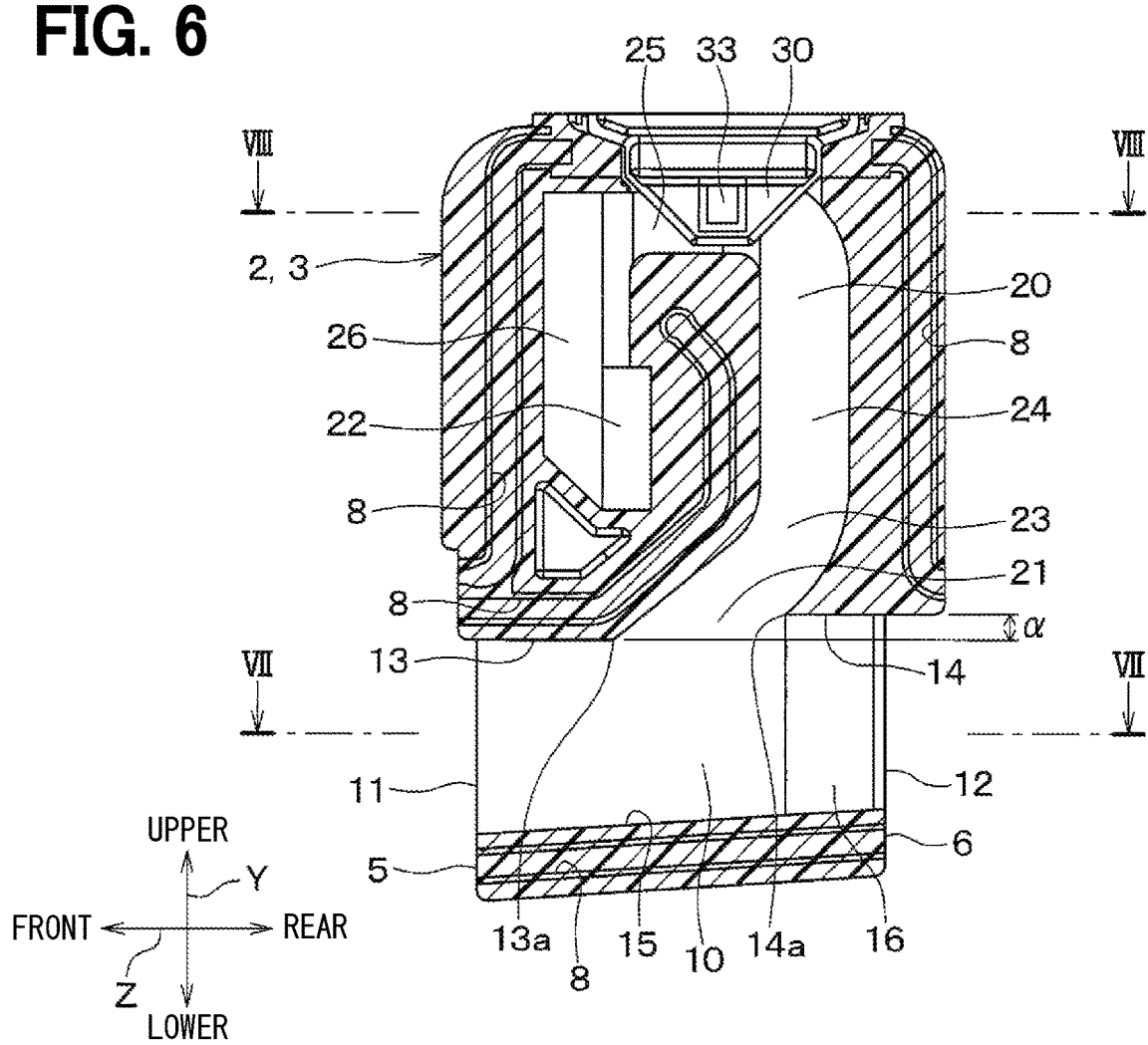
FIG. 6 is a cross-sectional view showing a bypass portion of a housing included in the air flow meter taken along the line VI-VI in FIGS. 3 and 4.

As shown in FIG. 6, a narrow groove 8 is formed on a surface of the first housing member 2a on the side of the second housing member 2b. Although not shown, the narrow groove 8 is also formed on the surface of a second housing member 2b on the side of the first housing member 2a at the same position as that of the first housing member 2a. The first housing member 2a and the second housing member 2b are fixed together by injecting an adhesive such as molten resin into the narrow groove 8. Note that FIG. 6 shows a cross section of the bypass portion 3 of the first housing member 2a, and the holding portion 4 is omitted.

As shown in FIG. 6, the first sub-passage 10 is a passage that communicates a first sub-passage inlet 11 formed in the front surface 5 of the housing 2 with a first sub-passage outlet 12 formed in the rear surface 6 of the housing 2. The first sub-passage 10 may be referred to as a bypass passage.

Further, the second sub-passage 20 communicates a second sub-passage inlet 21 formed in a midway portion of the first sub-passage 10 with a second sub-passage outlet 22 formed at a position different from that of the first sub-passage outlet 12. In the present embodiment, the second sub-passage outlet 22 is formed in the side surface 7 of the housing 2. The second sub-passage 20 may be referred to as a branch passage or a sub-bypass passage that branches from a midway portion of the first sub-passage 10.

Hereinafter, the first sub-passage 10 and the second sub-passage 20 will be described in detail. In the following description, an upstream side of the intake passage 102 is referred to as a front side, and a downstream side of the intake passage 102 is referred to as a rear side. Further, the housing 2 on the side of the holding portion 4 is referred to as an upper side, and the housing 2 on the opposite side of the holding portion 4 is referred to as a lower side. Further, the thickness direction of the bypass portion 3 is referred to as an X direction, the vertical direction is referred to as a Y direction, and the front-rear direction is referred to as a Z direction.

In the present embodiment, the first sub-passage 10 is formed substantially linearly from the first sub-passage inlet 11 to the first sub-passage outlet 12. That is, the first sub-passage inlet 11 and the first sub-passage outlet 12 are formed so that at least a part thereof overlap each other when viewed in the Z direction. With this configuration, dust contained in the air flowing from the first sub-passage inlet 11 toward the first sub-passage outlet 12 through the first sub-passage 10 is easily discharged from the first sub-passage outlet 12 due to its inertial force.

A portion of an upper inner wall of the first sub-passage 10 on the front side of the second sub-passage inlet 21 and a portion of the upper inner wall of the first sub-passage 10 on the rear side of the second sub-passage inlet 21 form a step a in the Y direction. In the following description, the portion of the upper inner wall of the first sub-passage 10 on the front side of the second sub-passage inlet 21 is referred to as a front upper inner wall 13 of the first sub-passage 10. Further, the portion of the upper inner wall of the first sub-passage 10 on the rear side of the second sub-passage inlet 21 is referred to as a rear upper inner wall 14 of the first sub-passage 10. That is, the front upper inner wall 13 of the first sub-passage 10 and the rear upper inner wall 14 of the first sub-passage 10 form a step a in the Y direction. Specifically, a rear end 13a of the front upper inner wall 13 of the first sub-passage 10 is located on the lower side of a front end 14a of the rear upper inner wall 14 of the first sub-passage 10. With this configuration, dust contained in the air flowing through the first sub-passage 10 along the front upper inner wall 13 is less likely to enter the second sub-passage 20. The rear end 13a of the front upper inner wall 13 of the first sub-passage 10 may also be referred to as a front end of the second sub-passage inlet 21. The front end 14a of the rear upper inner wall 14 of the first sub-passage 10 may also be referred to as a rear end of the second sub-passage inlet 21.

Further, an inner wall 15 on the lower side of the first sub-passage 10 is inclined upward from the first sub-passage inlet 11 toward the first sub-passage outlet 12.

Figure 7:
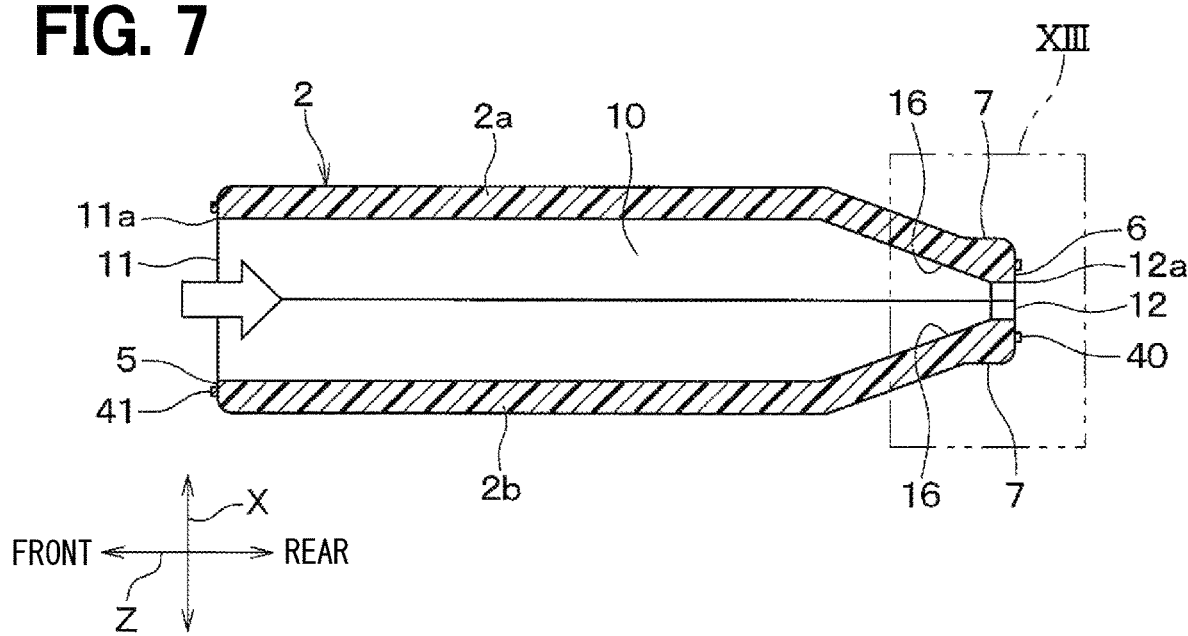
FIG. 7 is a cross-sectional view taken along the line VII-VII in FIG. 6.

As shown in FIGS. 6 and 7, the inner walls of the first sub-passage 10 on the left side and the right side in the X direction have inclined portions 16 on the rear side of the second sub-passage inlet 21. The inclined portions 16 are inclined so as to approach each other from the front side to the rear side in the Z direction. Therefore, the area of the first sub-passage 10 on the rear side of the second sub-passage inlet 21 is gradually reduced toward the first sub-passage outlet 12. With this configuration, a pressure loss of the air flowing through the portion of the first sub-passage 10 on the rear side of the second sub-passage inlet 21 becomes large, and therefore, a part of the air flowing from the first sub-passage inlet 11 to the first sub-passage outlet 12 through the first sub-passage 10 tends to flow to the second sub-passage 20.

As shown in FIG. 6, the second sub-passage 20 has an introduction portion 23, a rear vertical portion 24, a folded-back portion 25, and a front vertical portion 26. The introduction portion 23 is a passage extending to the rear side and diagonally upward from the second sub-passage inlet 21. The rear vertical portion 24 is a passage extending further to the upper side from an upper end of the introduction portion 23. The folded-back portion 25 is a passage extending to the front side from an upper end of the rear vertical portion 24. The front vertical portion 26 is a passage extending to the lower side from a front end of the folded-back portion 25. The second sub-passage outlet 22 is formed at a rear portion of a lower end of the front vertical portion 26.

The introduction portion 23 of the second sub-passage 20 extends to the rear side and diagonally to the upper side from the second sub-passage inlet 21. Therefore, a part of the air that flows from the first sub-passage inlet 11 toward the first sub-passage outlet 12 through the first sub-passage 10 easily flows to the second sub-passage 20. As described above, dust contained in the air flowing from the first sub-passage inlet 11 to the first sub-passage outlet 12 flows to the first sub-passage outlet 12 due to the inertial force, and therefore, air that does not contain dust flows in the second sub-passage 20.

Figure 8:
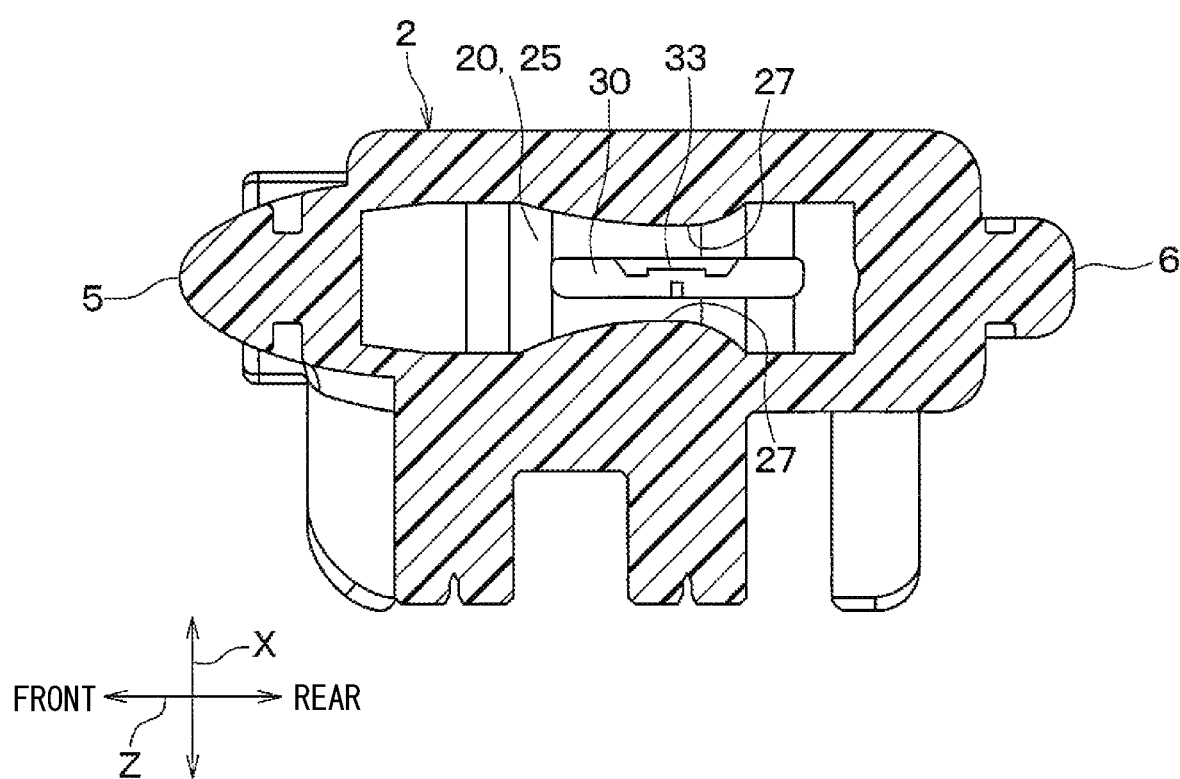
FIG. 8 is a cross-sectional view taken along a line VIII-VIII in FIG. 6.

The flow rate detection unit 30 is provided in the folded-back portion 25 of the second sub-passage 20. The flow rate detection unit 30 of the present embodiment includes a semiconductor element 33 that is configured to detect the flow rate of air flowing on the surface thereof. As shown in FIG. 8, the inner wall of the folded-back portion 25 of the second sub-passage 20 is provided with a throttle portion 27 for reducing the flow passage area of a portion where the flow rate detection unit 30 is provided. Therefore, the air flowing through the second sub-passage 20 flows so as to be in contact with the surface of the semiconductor element 33 included in the flow rate detection unit 30. Thus, the flow rate detection unit 30 outputs a signal corresponding to the flow rate of the air flowing through the second sub-passage 20. The signal is transmitted to the ECU 112 via the terminal 31, the wiring, and the like as described above.

Figure 9:
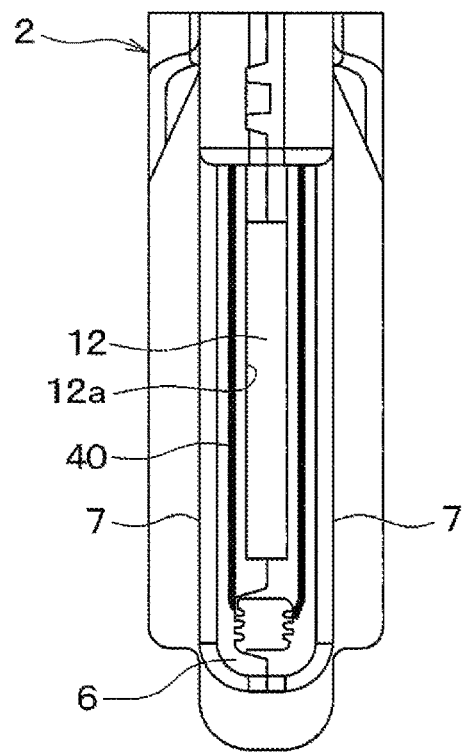
FIG. 9 is an enlarged view showing a portion IX in FIG. 4.

As shown in FIG. 9, on the rear surface 6 of the housing 2, the mold parting mark 40 is formed at a position where the mold parting portion resides at the time of injection molding of the housing 2. In FIG. 9, for convenience of explanation, the mold parting mark 40 is shown by the thick line to distinguish it from other lines. The mold parting mark 40 is on the rear surface 6 of the housing 2 at a position away from an inner opening edge 12a of the first sub-passage outlet 12. Specifically, it is preferable that the mold parting mark 40 is at a position on the rear surface 6 of the housing 2 so as not to be in contact with the inner opening edge 12a of the first sub-passage outlet 12. Further, the mold parting mark 40 is at a position away from the side surface 7. Specifically, it is preferable that the mold parting mark 40 is at a position where the entirety of the mold parting mark 40 is not in contact with the side surface 7.

Further, it is preferable that the mold parting mark 40 is located at a position in the rear surface 6 of the housing 2 that is closer to the center between the side surface 7 and the inner opening edge 12a than the side surface 7 and the inner opening edge 12a.

Figure 10:
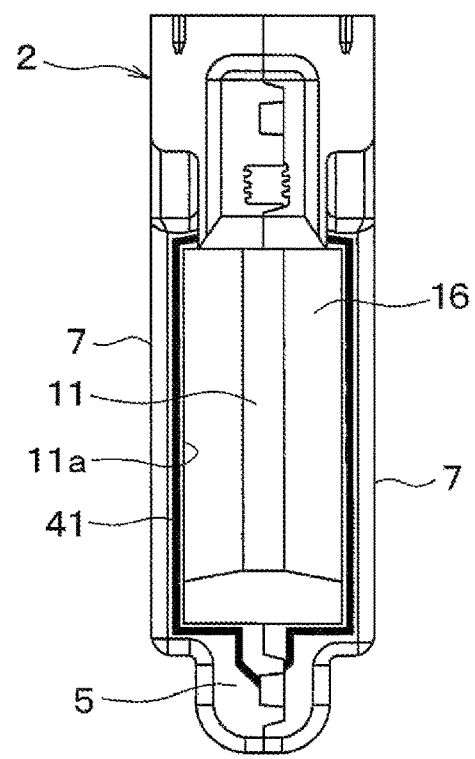
FIG. 10 is an enlarged view showing a portion X in FIG. 3.

As shown in FIG. 10, a mold parting mark is also formed on the front surface 5 of the housing 2 at a position where the mold parting portion resides at the time of injection molding of the housing 2. The mold parting mark formed on the front surface 5 of the housing 2 is referred to as a front mold parting mark 41. In FIG. 10, for convenience of explanation, the front mold parting mark 41 is shown by the thick line to distinguish it from other lines. The front mold parting mark 41 is formed on the front surface 5 of the housing 2 at a position away from an inner opening edge 11a of the first sub-passage inlet 11. Specifically, it is preferable that the front mold parting mark 41 is at a position on the front surface 5 of the housing 2 so as not to be in contact with the inner opening edge 11a of the first sub-passage inlet 11. Further, the front mold parting mark 41 is at a position away from the side surface 7. Specifically, it is preferable that the front mold parting mark 41 is at a position where the entirety of the front mold parting mark 41 is not in contact with the side surface 7.

Further, it is preferable that the front mold parting mark 41 is located at a position in the front surface 5 of the housing 2 that is closer to the center between the side surface 7 and the inner opening edge 11a than the side surface 7 and the inner opening edge 11a.

Figure 11:
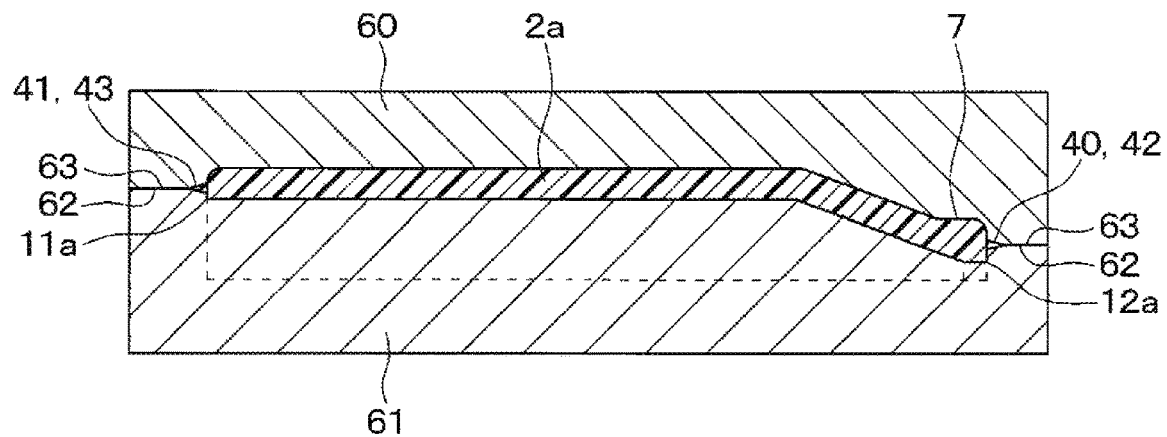
FIG. 11 is an explanatory view for explaining a method for manufacturing the housing of the air flow meter.
Figure 12:
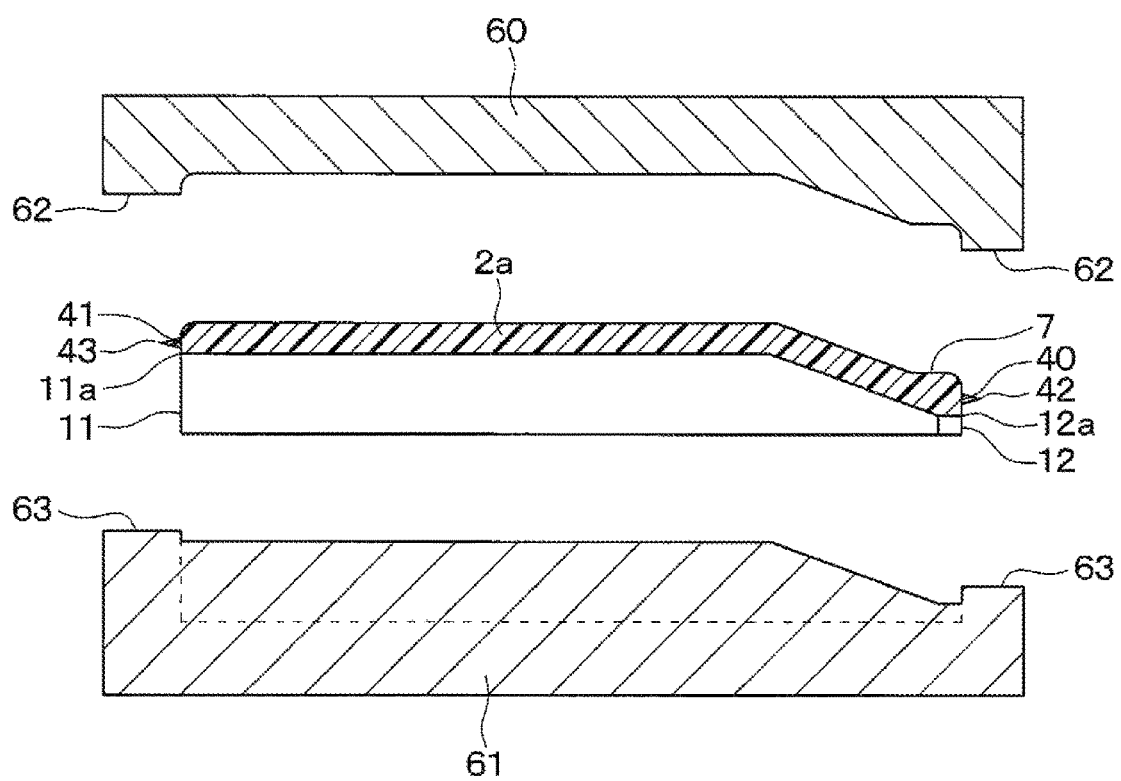
FIG. 12 is an explanatory view for explaining the method for manufacturing the housing of the air flow meter.

Herein, injection molding of the housing 2 will be described. FIGS. 11 and 12 schematically show a part of a process of the injection molding for the first housing member 2a of the housing 2.

Generally, in injection molding, as shown in FIG. 11, after molding dies 60 and 61 are closed and clamped together, molten resin is poured into a cavity that is in a product shape between the molding dies 60 and 61. Then, after the resin is cooled and solidified, as shown in FIG. 12, the molding dies are opened, and the molded product is taken out from the molding dies 60 and 61.

As shown in FIG. 11, in the present embodiment, parting portions 62, 63 of the molding dies 60, 61 for injection molding are at a position in the rear surface 6 of the housing 2 that is away from the inner opening edge 12a of the first sub-passage outlet 12 and that is away from the side surface 7. Further, the parting portions 62 and 63 of the molding dies 60 and 61 are at a position that is away from the inner opening edge 11a of the first sub-passage inlet 11 and that is also away from the side surface 7 in the front surface 5 of the housing 2. Therefore, the mold parting marks 40 and the front mold parting marks 41 of the molding dies 60 and 61 are formed at positions in the rear surface 6 and the front surface 5 of the housing 2 taken out from the molding dies 60 and 61, respectively, and at positions where the parting portions 62 and 63 have resided, respectively.

It is noted that, the mold parting mark 40 and the front mold parting mark 41 formed on the resin product such as the housing 2 appear as a small mark when the molding dies 60 and 61 are in an initial state or immediately after a maintenance work has been implemented on the molding dies 60 and 61. However, after the molding dies 60 and 61 have been used for a long period of time, when a gap is formed in the parting portions 62 and 63 of the molding dies 60 and 61 due to aging or the like, burrs 42 and 43 may be formed in the mold parting marks 40 and the front mold parting marks 41. FIGS. 11 and 12 show a state where the burrs 42 and 43 are formed on the mold parting mark 40 formed on the rear surface 6 of the first housing member 2a and the front mold parting mark 41 formed on the front surface 5 of the first housing member 2a, respectively.

Figure 13:
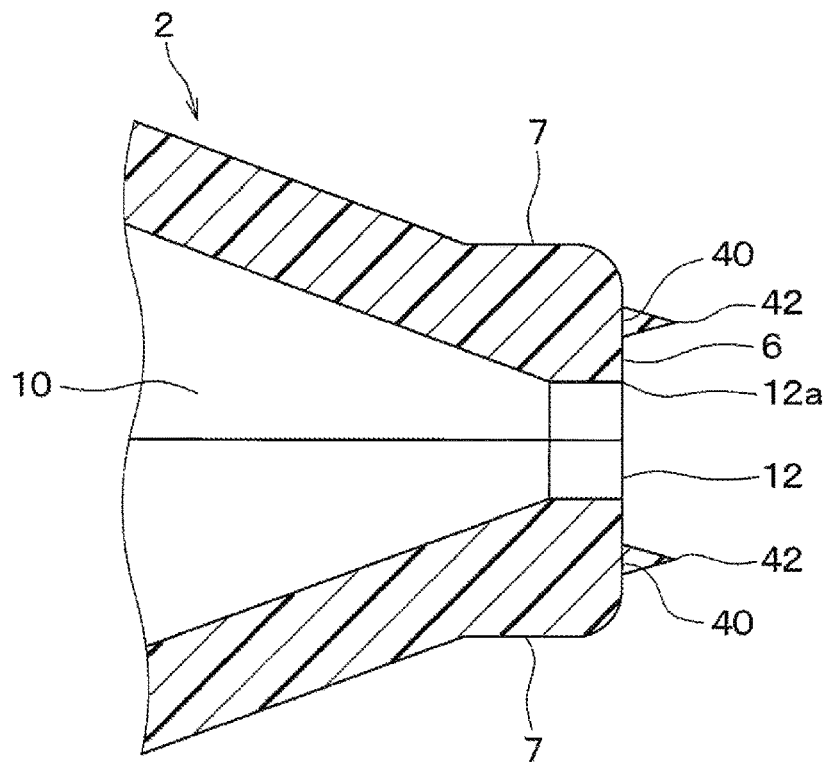
FIG. 13 is an explanatory view showing a state in which burrs are formed in mold parting marks on the rear surface of the housing.
Figure 14:
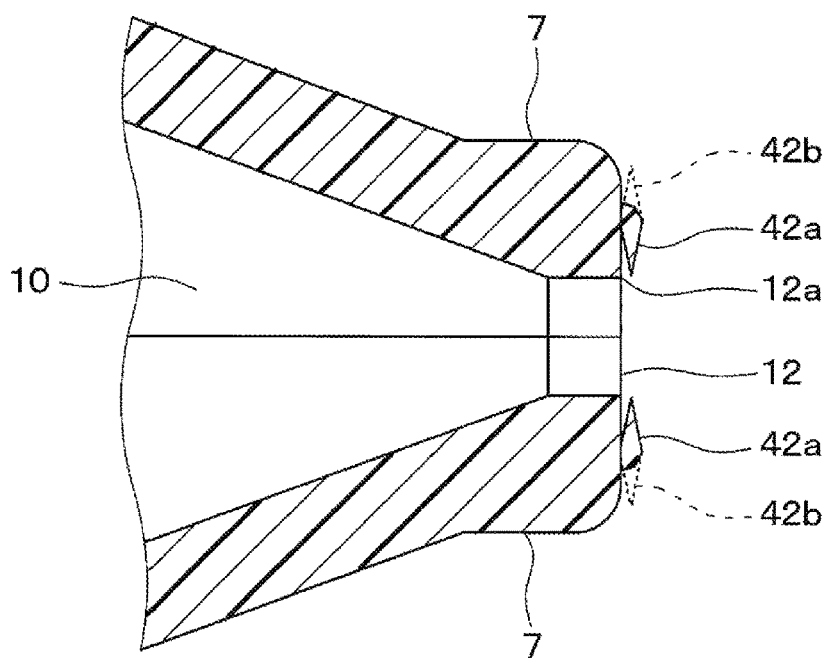
FIG. 14 is an explanatory view showing a state in which the burr shown in FIG. 13 is deformed.

FIG. 13 shows a state where the burr 42 is formed on the mold parting marks 40 on the rear surface 6 of the housing 2. Generally, the burr 42 formed on the mold parting mark 40 has a relatively low rigidity. Therefore, as shown by a solid line 42a in FIG. 14, the burr 42 may be deformed so as to fall toward the first sub-passage outlet 12. Even in that case, in the present embodiment, the burr 42 is restricted from protruding to the first sub-passage outlet 12. Further, as shown by a broken line 42b in FIG. 14, the burr 42 formed on the mold parting mark 40 may be deformed so as to fall toward the side surface 7. Even in that case, in the present embodiment, the burr 42 is restricted from protruding outward beyond the side surface 7.

Figure 15:
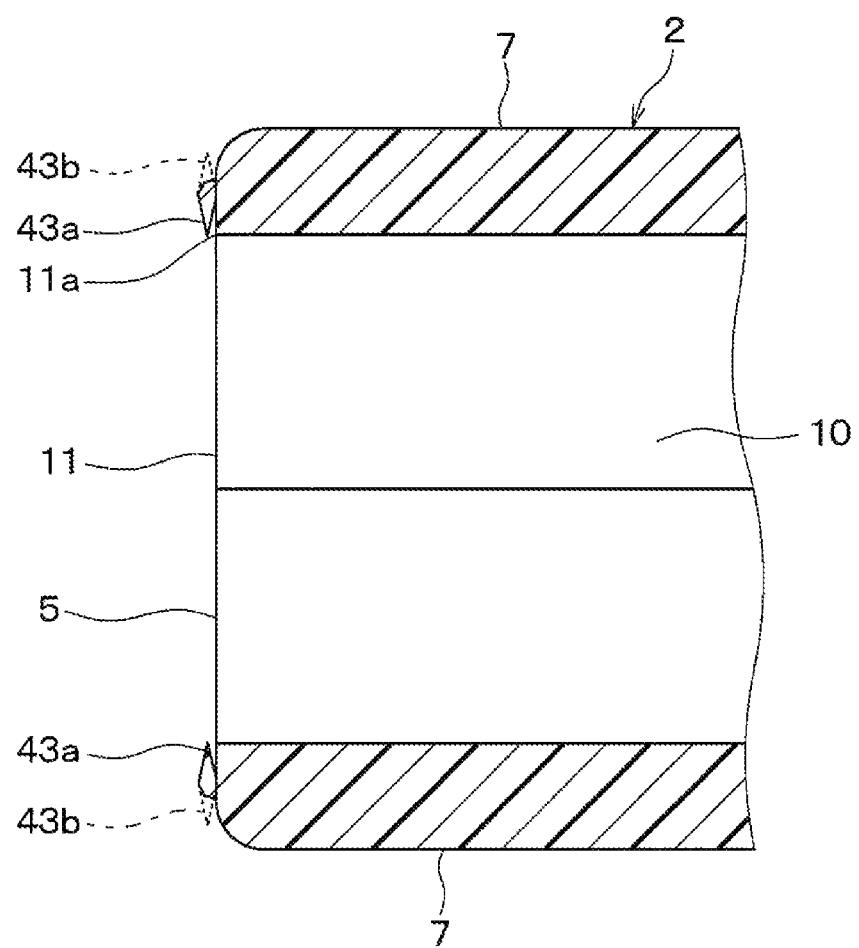
FIG. 15 is an explanatory view showing a state in which burrs formed in front mold parting marks on a front surface of the housing.

Further, as shown by a solid line 43a in FIG. 15, it is conceivable that the burr 43 formed on the front mold parting mark 41 in the front surface 5 of the housing 2 is also deformed so as to fall toward the first sub-passage inlet 11. Even in that case, in the present embodiment, the burr 43 is restricted from protruding to the first sub-passage inlet 11. Further, as shown by a broken line 43b in FIG. 15, it is conceivable that the burr 43 formed on the front mold parting mark 41 in the front surface 5 of the housing 2 is deformed so as to fall toward the side surface 7. Even in that case, in the present embodiment, the burr 43 is restricted from protruding outward beyond the side surface 7.

Herein, in order to make a comparison with the air flow meter 1 of the present embodiment, multiple comparative examples of air flow meters will be described.

First Comparative Example

Figure 22:
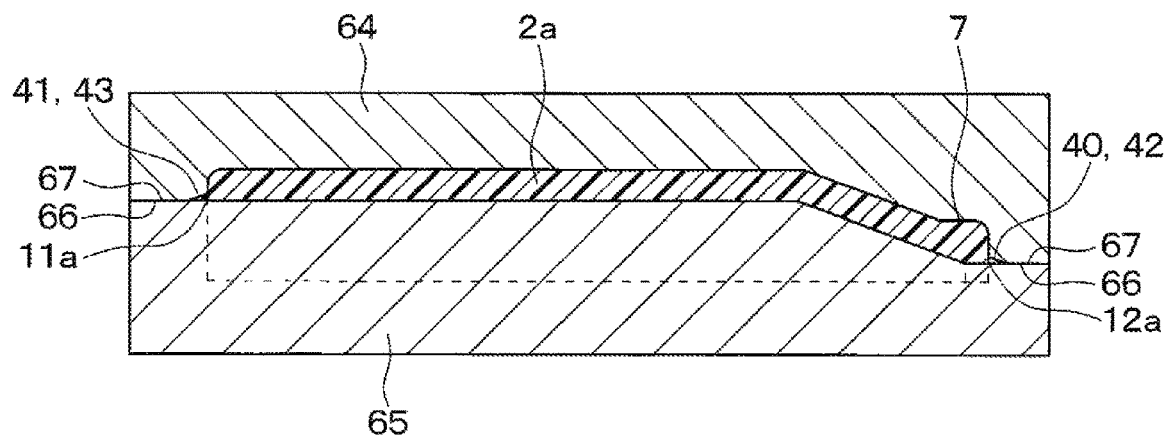
FIG. 22 is an explanatory view for explaining a method for manufacturing a housing of the air flow meter of a first comparative example.
Figure 23:
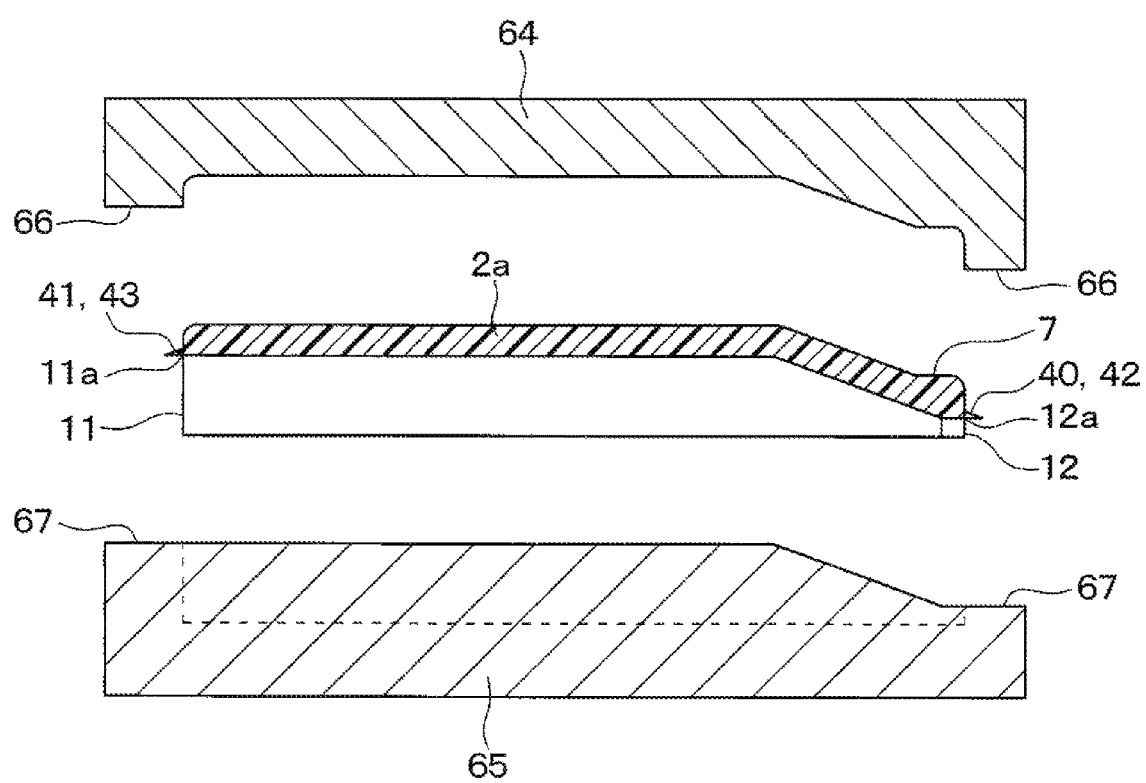
FIG. 23 is an explanatory view for explaining the method for manufacturing the housing of the air flow meter of the first comparative example.

A first comparative example will be described. FIGS. 22 and 23 schematically show a part of a process of injection molding for the first housing member 2a of the housing 2 included in the air flow meter of the first comparative example.

As shown in FIG. 22, in the first comparative example, parting portions 66 and 67 of molding dies 64 and 65 for injection molding are at the same position as that of the inner opening edge 12a of the first sub-passage outlet 12 in the rear surface 6 of the housing 2. Further, the parting portions 66 and 67 of the molding dies 64 and 65 are at the same positions as that of the inner opening edge 11a of the first sub-passage inlet 11 in the front surface 5 of the housing 2. Therefore, as shown in FIG. 23, the mold parting marks 40 and the front mold parting marks 41 of the molding dies 64 and 65 are formed at positions in the rear surface 6 and the front surface 5 of the housing 2 taken out from the molding dies 64 and 65, respectively, and at positions where the parting portions 66 and 67 have resided, respectively. That is, in the first comparative example, the mold parting mark 40 is formed on the inner opening edge 12a of the first sub-passage outlet 12, and the front mold parting mark 41 is formed on the inner opening edge 11a of the first sub-passage inlet 11. It should be noted that FIGS. 22 and 23 show a state in which the burrs 42 and 43 are formed on the mold parting mark 40 and the front mold parting mark 41, respectively.

Figure 24:
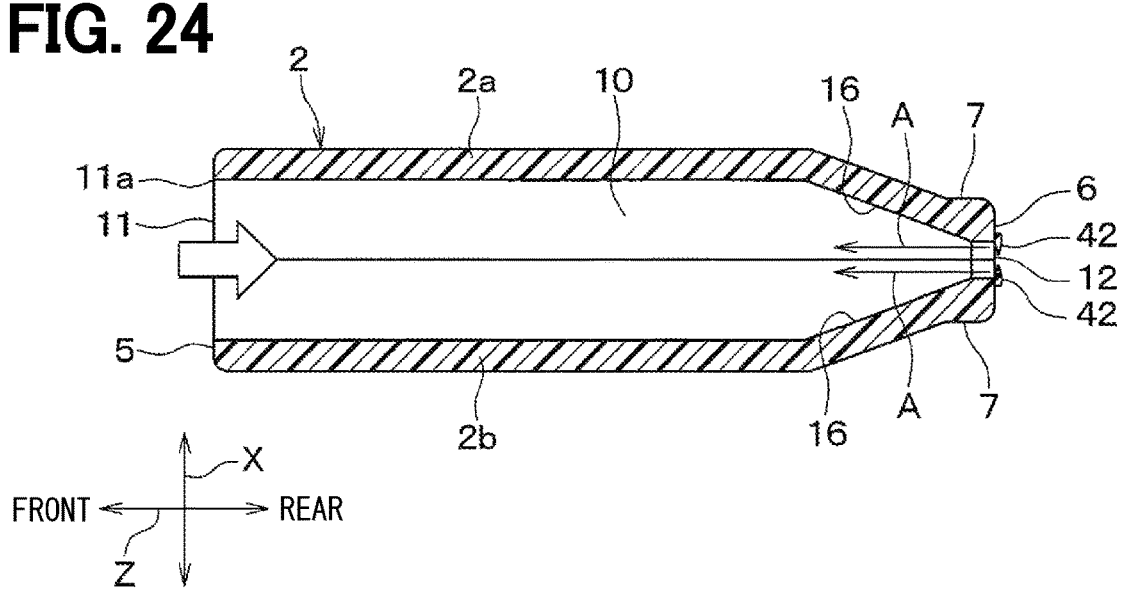
FIG. 24 is an explanatory view showing a state in which burrs formed in mold parting marks of the air flow meter of the first comparative example are deformed toward the first sub-passage outlet.

As shown in FIG. 24, in the first comparative example, when the burr 42 formed on the mold parting mark 40 in the rear surface 6 of the housing 2 is deformed so as to fall toward the first sub-passage outlet 12, the burr 42 protrudes to the first sub-passage outlet 12.

Figure 25:
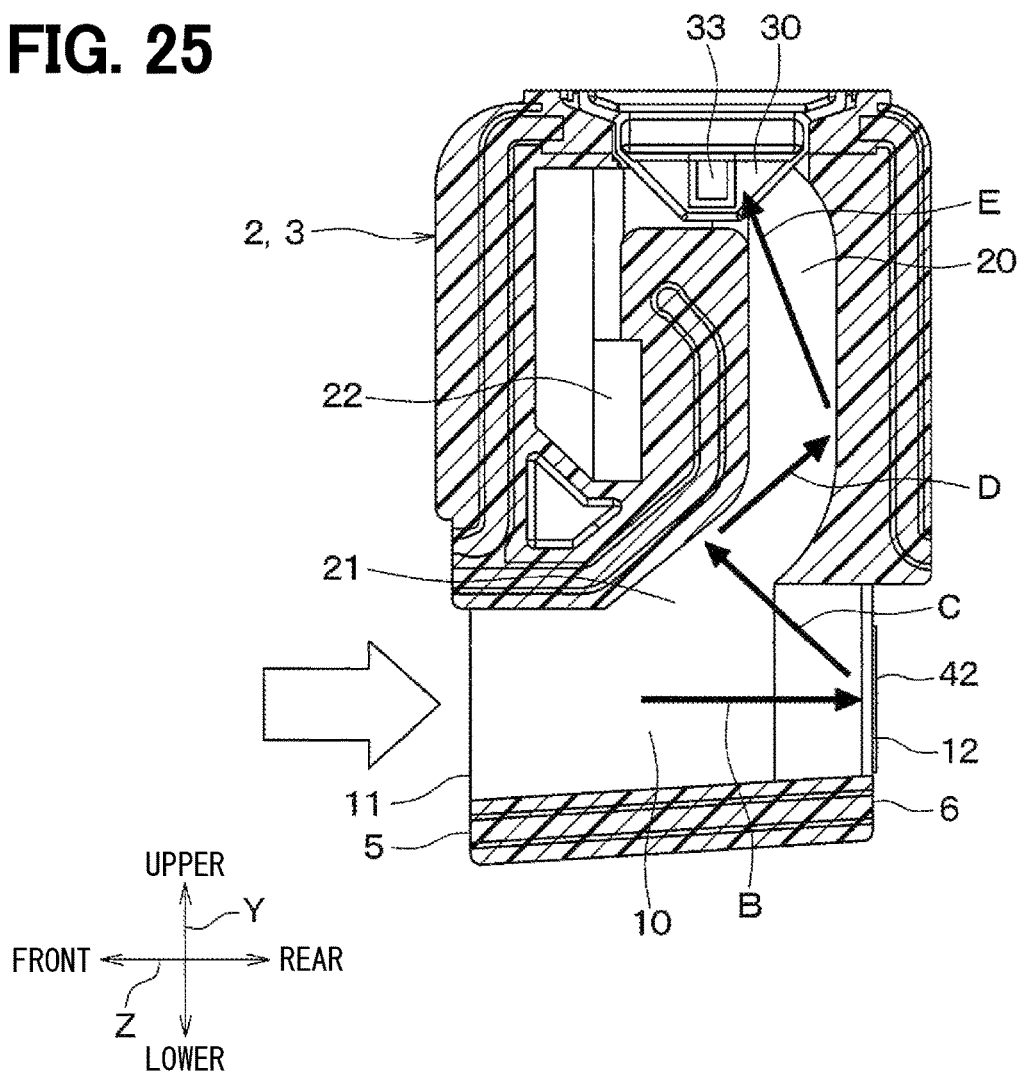
FIG. 25 is an explanatory view showing a state in which dust bounced on the burrs on the air flow meter of the first comparative example moves toward the flow rate detection unit in the second sub-passage.

In that case, as shown by the arrow A in FIG. 24 and the arrows B and C in FIG. 25, there is a risk that dust flowing through the first sub-passage 10 is bounced back by the burr 42 and is repelled into the first sub-passage 10 to enter the second sub-passage 20 through the second sub-passage inlet 21. Herein, in the second sub-passage 20, air flows from the second sub-passage inlet 21 to the second sub-passage outlet 22 through the flow rate detection unit 30. Therefore, as shown by the arrows D and E in FIG. 25, it is conceivable that the dust that has entered the second sub-passage 20 through the second sub-passage inlet 21 moves toward the flow rate detection unit 30 together with the air flow in the second sub-passage 20, and the dust adheres to the flow rate detection unit 30. If dust adheres to the semiconductor element 33 of the flow rate detection unit 30, an error may occur in the output signal of the flow rate detection unit 30, and a detection accuracy for the air flow rate may deteriorate.

Second Comparative Example

Figure 26:
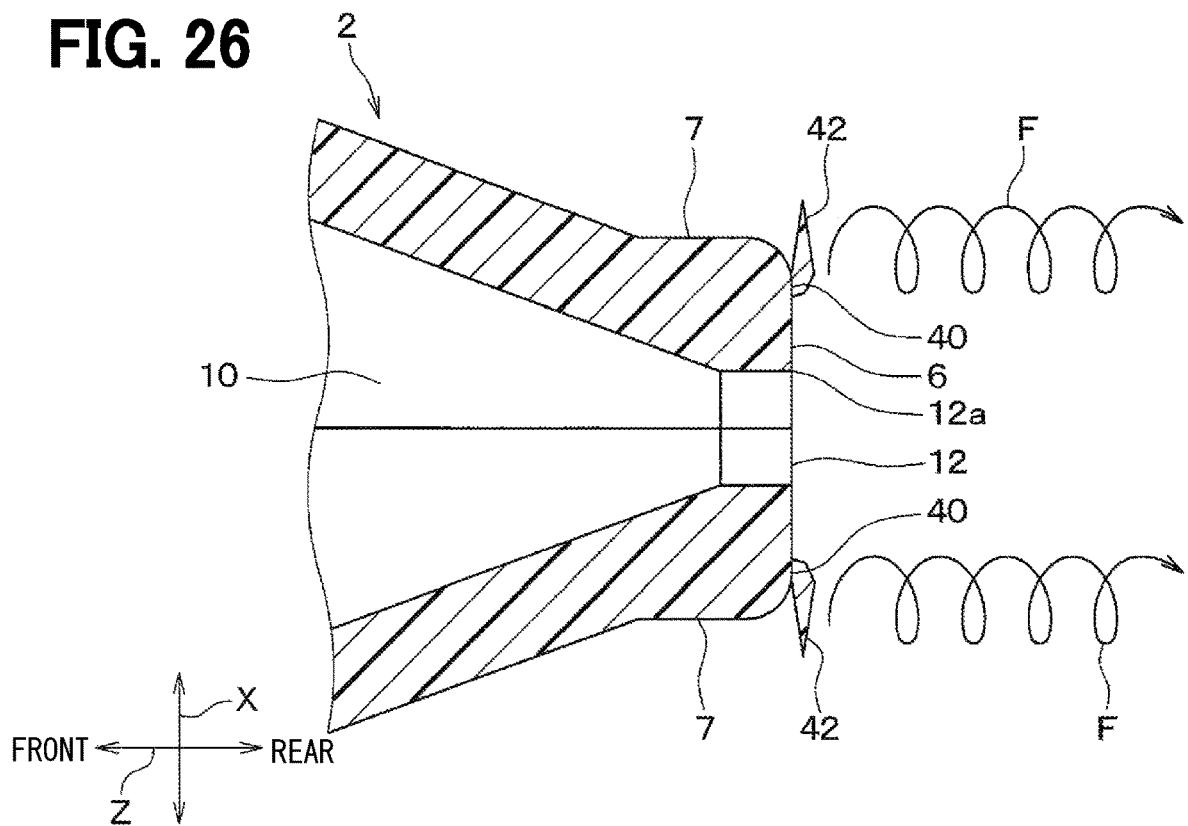
FIG. 26 is a cross-sectional view showing a rear portion of a housing included in an air flow meter of a second comparative example.

Next, a second comparative example will be described. FIG. 26 is a cross-sectional view showing a rear portion of the housing 2 included in an air flow meter of a second comparative example. As shown in FIG. 26, in the second comparative example, the mold parting mark 40 is formed in the rear surface 6 of the housing 2 at a position at which R ends in the corner of the side surface 7. Therefore, in the second comparative example, when the burr 42 formed on the mold parting mark 40 in the rear surface 6 of the housing 2 is deformed so as to fall toward the side surface 7, the burr 42 may protrude outward from the side surface 7. In that case, as shown by the arrow F in FIG. 26, it is conceivable that the air flow is disturbed by the burr 42, and a vortex is formed on the downstream side of the burr 42, and therefore, the air flow rate flowing out from the first sub-passage outlet 12 decreases. In a case where the flow rate of air flowing from the first sub-passage inlet 11 to the first sub-passage 10 is the same, the flow rate of air flowing into the second sub-passage 20 increases by the amount of the decrease in the flow rate of air flowing out from the first sub-passage outlet 12. Consequently, the detection accuracy of the flow rate detection unit 30 may deteriorate.

Third Comparative Example

Figure 27:
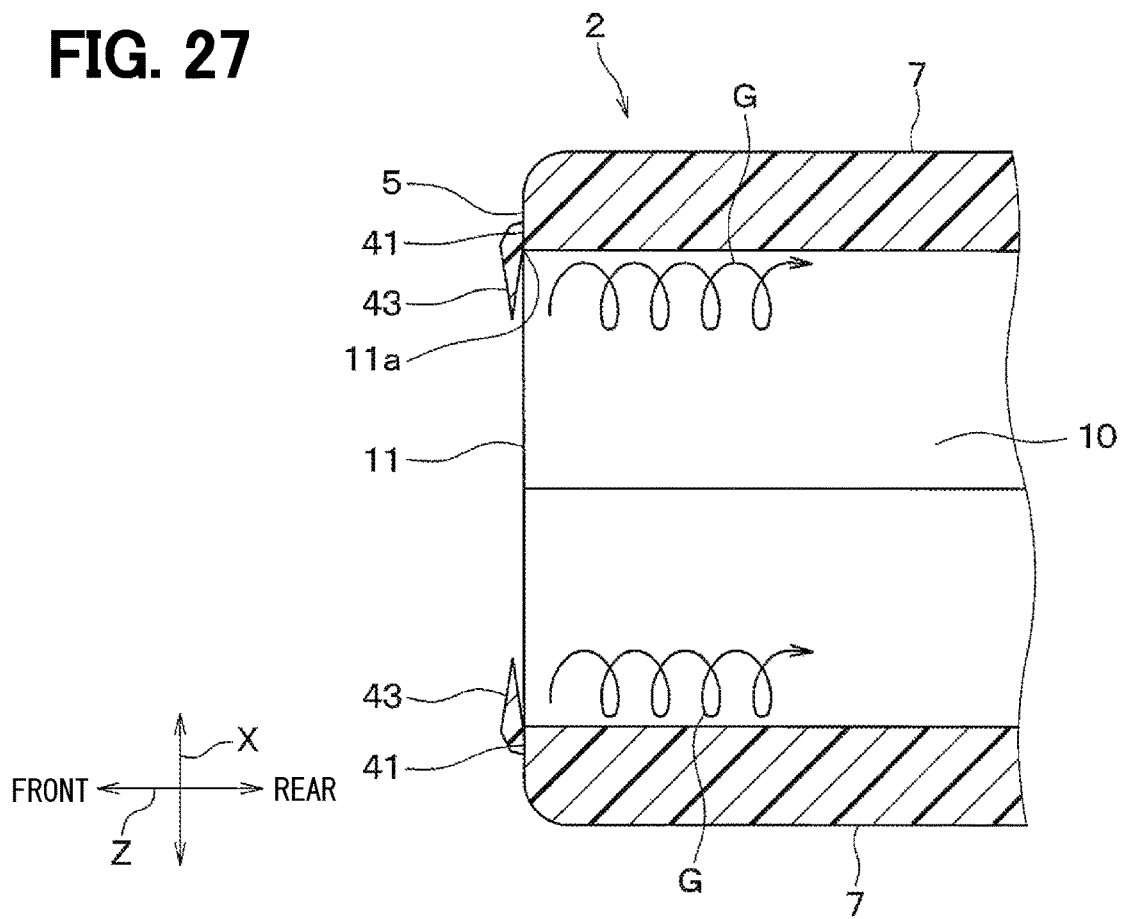
FIG. 27 is a cross-sectional view showing a front portion of a housing included in an air flow meter of a third comparative example.

Next, a third comparative example will be described. FIG. 27 is a cross-sectional view showing a rear portion of the housing 2 included in an air flow meter of the third comparative example. As shown in FIG. 27, in the third comparative example, the front mold parting mark 41 is formed on the inner opening edge 11a of the first sub-passage inlet 11 in the front surface 5 of the housing 2. Therefore, in the third comparative example, when the burr 43 formed on the front mold parting mark 41 in the front surface 5 of the housing 2 is deformed so as to fall toward the first sub-passage inlet 11, the burr 43 protrudes to the first sub-passage inlet 11. In this case, it is conceivable that the opening area of the first sub-passage inlet 11 is reduced, and the flow rate of air flowing into the first sub-passage 10 is reduced. Further, as shown by the arrow G in FIG. 27, it is conceivable that a vortex is formed on the downstream side of the burr 43, and the flow rate of air flowing into the first sub-passage 10 is reduced due to the influence thereof. As a result, the flow rate of air flowing from the first sub-passage 10 to the second sub-passage 20 may decrease, and the detection accuracy of the flow rate detection unit 30 may deteriorate.

Fourth Comparative Example

Figure 28:
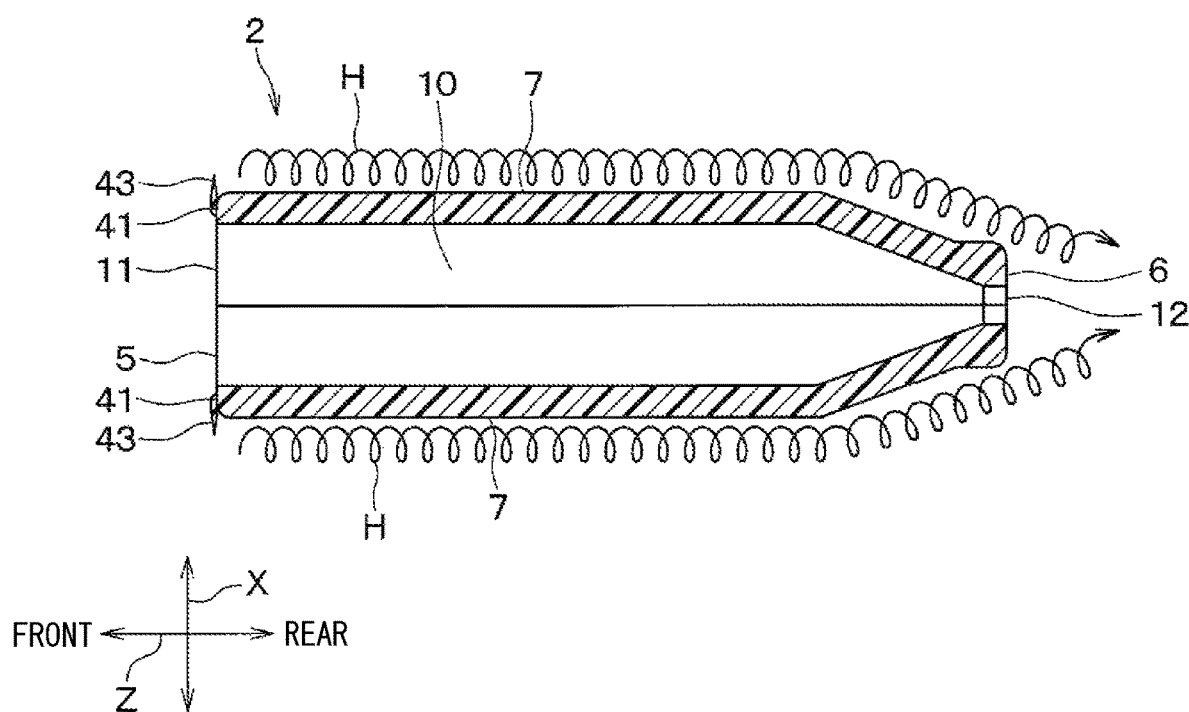
FIG. 28 is a cross-sectional view showing a housing included in an air flow meter of a fourth comparative example.

Next, a fourth comparative example will be described. FIG. 28 is a cross-sectional view showing the housing 2 included in an air flow meter of a fourth comparative example. As shown in FIG. 28, in the fourth comparative example, the mold parting mark 40 is formed in the front surface 5 of the housing 2 at a position at which R ends in the corner of the side surface 7. Therefore, in the fourth comparative example, when the burr 43 formed on the front mold parting mark 41 in the front surface 5 of the housing 2 is deformed so as to fall toward the side surface 7, the burr 43 may protrude outward from the side surface 7. In this case, as shown by the arrow H in FIG. 28, in a case where a vortex formed on the downstream side of the burr 43 extends to the first sub-passage outlet 12, it is conceivable that the flow rate of air flowing out from the first sub-passage outlet 12 may decrease. In a case where the flow rate of air flowing from the first sub-passage inlet 11 to the first sub-passage 10 is the same, the flow rate of air flowing into the second sub-passage 20 increases by the amount of the decrease in the flow rate of air flowing out from the first sub-passage outlet 12. Consequently, the detection accuracy of the flow rate detection unit 30 may deteriorate.

The air flow meter 1 of the first embodiment produces the following effects with respect to the above-described first to fourth comparative examples.

(1) In the first embodiment, the mold parting mark 40 in the rear surface 6 of the housing 2 is at the position away from the inner opening edge 12a of the first sub-passage outlet 12.

With this configuration, even in a case where the burr 42 is formed on the mold parting mark 40 in the rear surface 6 of the housing 2 due to aging of the molding dies 60 and 61 for injection molding and where the burr 42 is deformed toward the first sub-passage outlet 12, the burr 42 is restricted from protruding to the first sub-passage outlet 12. Therefore, dust flowing through the first sub-passage 10 and discharged from the first sub-passage outlet 12 is not bounced back into the first sub-passage 10 by the burr 42, thereby to restrict the dust from intruding into the second sub-passage 20. Therefore, it is possible to restrict dust from adhering to the flow rate detection unit 30 provided in the second sub-passage 20. As described above, the air flow meter 1 is configured to restrict deterioration of the detection accuracy of the air flow rate and to improve a reliability of the detection accuracy even in a case where the burr 42 is formed on the mold parting mark 40 in the rear surface 6 of the housing 2.

(2) In the first embodiment, the mold parting mark 40 in the rear surface 6 of the housing 2 is formed at the position away from the inner opening edge 12a of the first sub-passage outlet 12 and at a position away from the side surface 7.

With this configuration, even in a case where the burr 42 is formed on the mold parting mark 40 in the rear surface 6 of the housing 2 and where the burr 42 is deformed toward the side surface 7 of the housing 2, the burr 42 is restricted from protruding outward beyond the side surface 7. Therefore, the flow of air passing along the side surface 7 of the housing 2 is restricted from being disturbed by the burr 42, and change in the flow rate of the air flowing out from the first sub-passage outlet 12 is restricted, and therefore, the change in the flow rate of the air flowing through the second sub-passage 20 caused by this is also restricted. Thus, the air flow meter 1 is configured to restrict deterioration of the detection accuracy and to improve a reliability of the detection accuracy even in a case where the burr 42 is formed on the mold parting mark 40 in the rear surface 6 of the housing 2.

(3) In the first embodiment, the front mold parting mark 41 in the front surface 5 of the housing 2 is at the position away from the inner opening edge 11a of the first sub-passage inlet 11.

With this configuration, even in a case where the burr 43 is formed on the front mold parting mark 41 and where the burr 43 is deformed toward the first sub-passage inlet 11, the burr 43 is restricted from protruding to the first sub-passage inlet 11. Therefore, the change in the flow rate of the air flowing from the first sub-passage inlet 11 is restricted, and the change in the flow rate of the air flowing through the second sub-passage 20 caused by this is also restricted. Thus, the air flow meter 1 is configured to restrict deterioration of the detection accuracy and to improve a reliability of the detection accuracy even in a case where the burr 43 is formed on the front mold parting mark 41 in the front surface 5 of the housing 2.

(4) In the first embodiment, the front mold parting mark 41 in the front surface 5 of the housing 2 is formed at the position away from the inner opening edge 11a of the first sub-passage inlet 11 and at a position away from the side surface 7.

With this configuration, even in a case where the burr 43 is formed on the front mold parting mark 41 and where the burr 43 is deformed toward the side surface 7 of the housing 2, the burr 43 is restricted from protruding outward beyond the side surface 7. Therefore, the flow of air passing around the side surface 7 of the housing 2 is restricted from being disturbed by the burr 43, and change in the flow rate of the air flowing out from the first sub-passage outlet 12 is restricted, and therefore, the change in the flow rate of the air flowing through the second sub-passage 20 caused by this is also restricted. Thus, the air flow meter 1 is configured to restrict deterioration of the detection accuracy and to improve a reliability of the detection accuracy even in a case where the burr 43 is formed on the front mold parting mark 41 in the front surface 5 of the housing 2.

Second Embodiment

A second embodiment will be described. The second embodiment is similar to the first embodiment except for a part of the configuration of the first sub-passage 10 modified from the corresponding configuration of the first embodiment. Accordingly, only parts different from the corresponding parts of the first embodiment are herein described.

Figure 16:
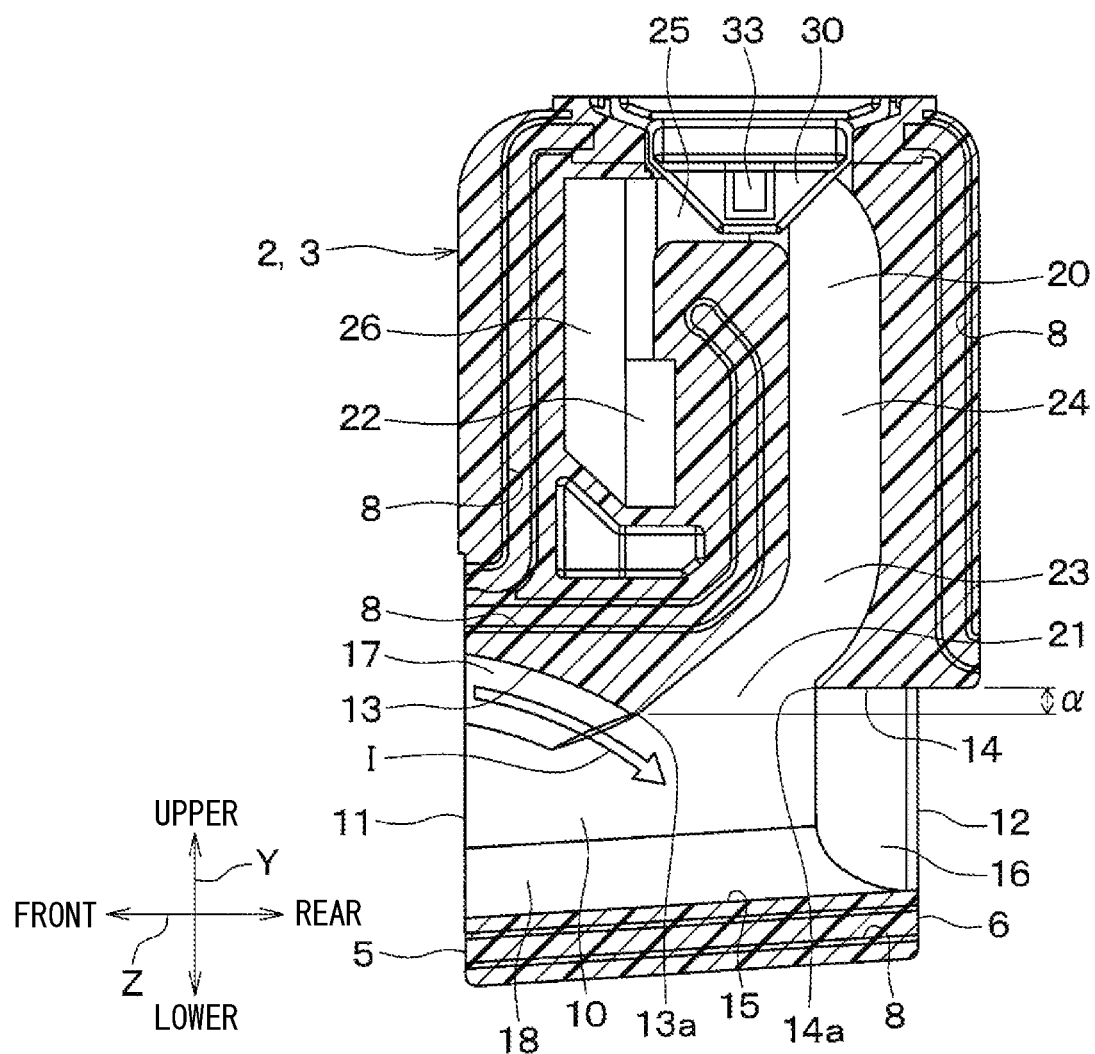
FIG. 16 is a cross-sectional view showing a housing included in an air flow meter of a second embodiment.

As shown in FIG. 16, in the second embodiment, the front upper inner wall 13 of the first sub-passage 10 is curved in a convex shape diagonally to the lower side and to the rear side. The front upper inner wall 13 is formed so as to extend toward the inner wall 15 on the lower side of the first sub-passage 10 from the upstream side to the downstream side. In other words, the front upper inner wall 13 of the first sub-passage 10 is curved so as to move away from the second sub-passage inlet 21 from the upstream side to the downstream side. Specifically, the rear end 13a of the front upper inner wall 13 of the first sub-passage 10 is located on the lower side of the front end 14a of the rear upper inner wall 14 of the first sub-passage 10. In this configuration, as shown by the arrow I in FIG. 16, the air flowing through the first sub-passage 10 from the first sub-passage inlet 11 to the first sub-passage outlet 12 flows along the front upper inner wall 13 of the first sub-passage 10 and flows away from the second sub-passage inlet 21. Therefore, dust contained in the air flow is less likely to enter the second sub-passage 20.

The front upper inner wall 13 of the first sub-passage 10 has an upper arc surface 17 having an arc shape when viewed in the Z direction. Further, the inner wall of the first sub-passage 10 on the lower side in the Y direction has a lower arc surface 18 having an arc shape when viewed in the Z direction. That is, the first sub-passage 10 has four corners (that is, the upper arc surface 17 and the lower arc surface 18) formed in the arc shape when viewed in the Z direction.

In also the second embodiment, the mold parting mark 40 in the rear surface 6 of the housing 2 is formed at the position away from the inner opening edge 12a of the first sub-passage outlet 12 and at a position away from the side surface 7. In addition, the front mold parting mark 41 in the front surface 5 of the housing 2 is formed at the position away from the inner opening edge 11a of the first sub-passage inlet 11 and at a position away from the side surface 7.

Also in the configuration of the second embodiment described above, it is possible to restrict dust from entering the second sub-passage 20 from the first sub-passage 10 and to restrict dust from adhering to the semiconductor element 33 of the flow rate detection unit 30. Therefore, the air flow meter 1 of the second embodiment can also restrict deterioration of the detection accuracy and improve the reliability of the detection accuracy.

Third Embodiment

A third embodiment will be described. The third embodiment is similar to the first embodiment except for the configuration of the housing 2 modified from the corresponding configuration of the first embodiment. Accordingly, only parts different from the corresponding parts of the first embodiment are herein described.

Figure 17:
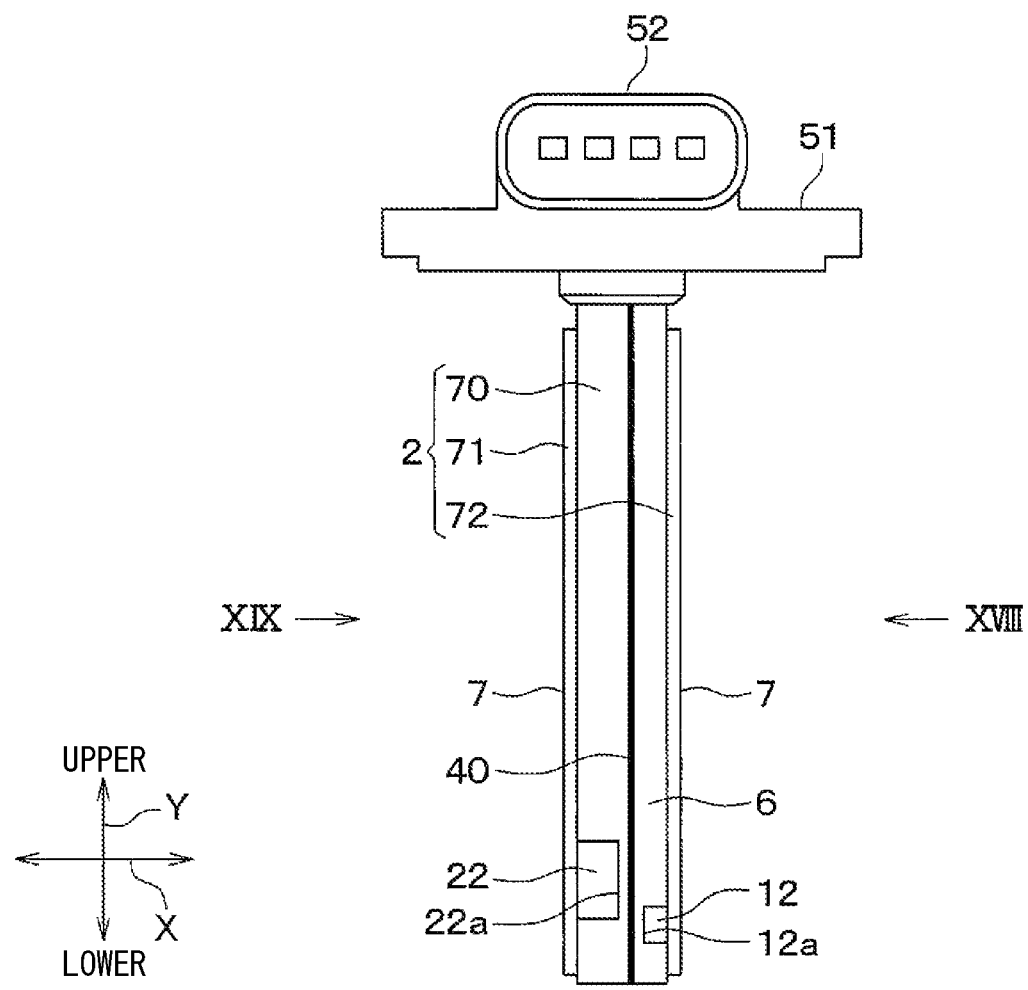
FIG. 17 is a rear view showing the air flow meter of a third embodiment.
Figure 18:
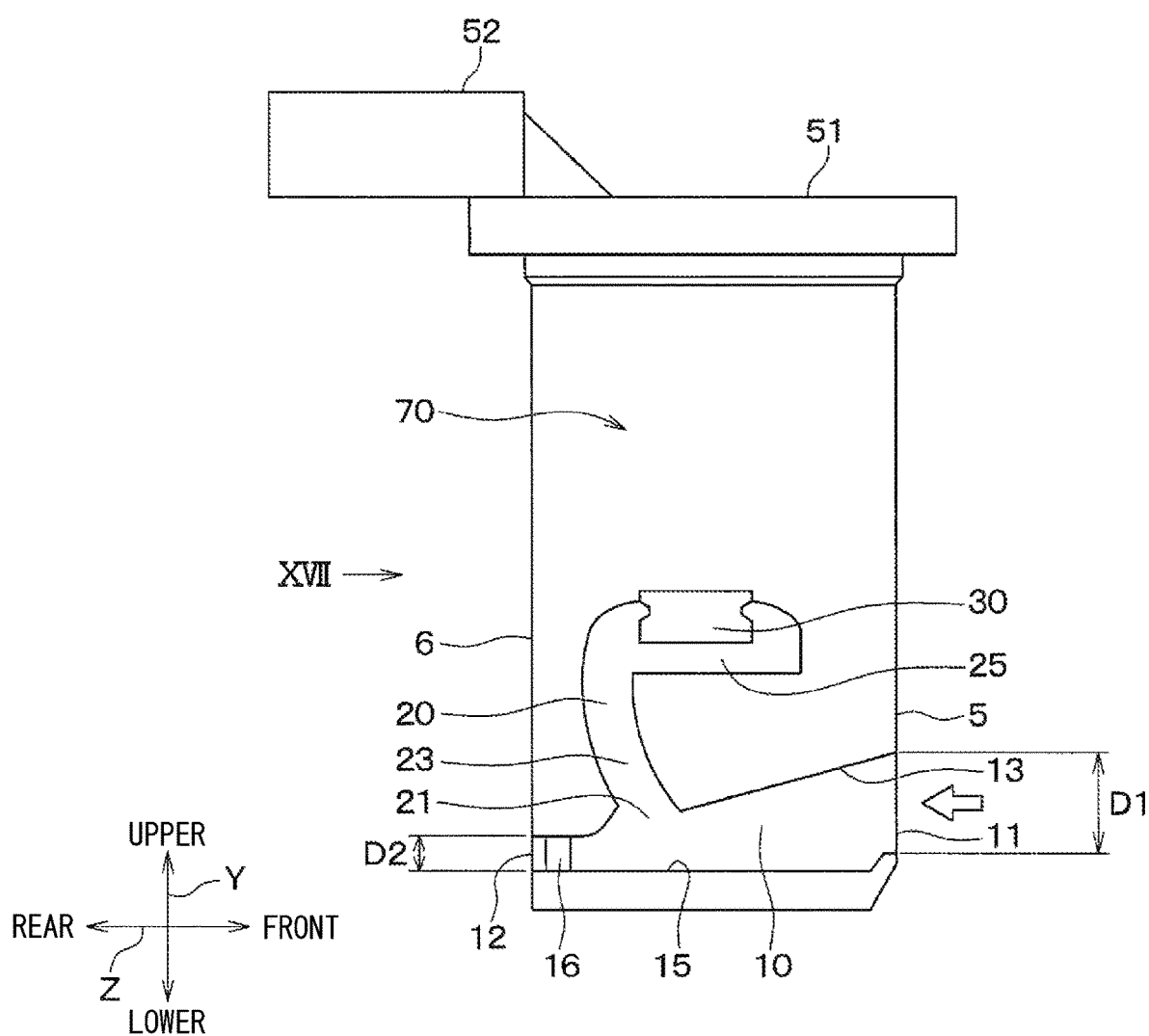
FIG. 18 is a side view showing the air flow meter from which a housing plate is removed when viewed along the XVIII direction in FIG. 17.
Figure 19:
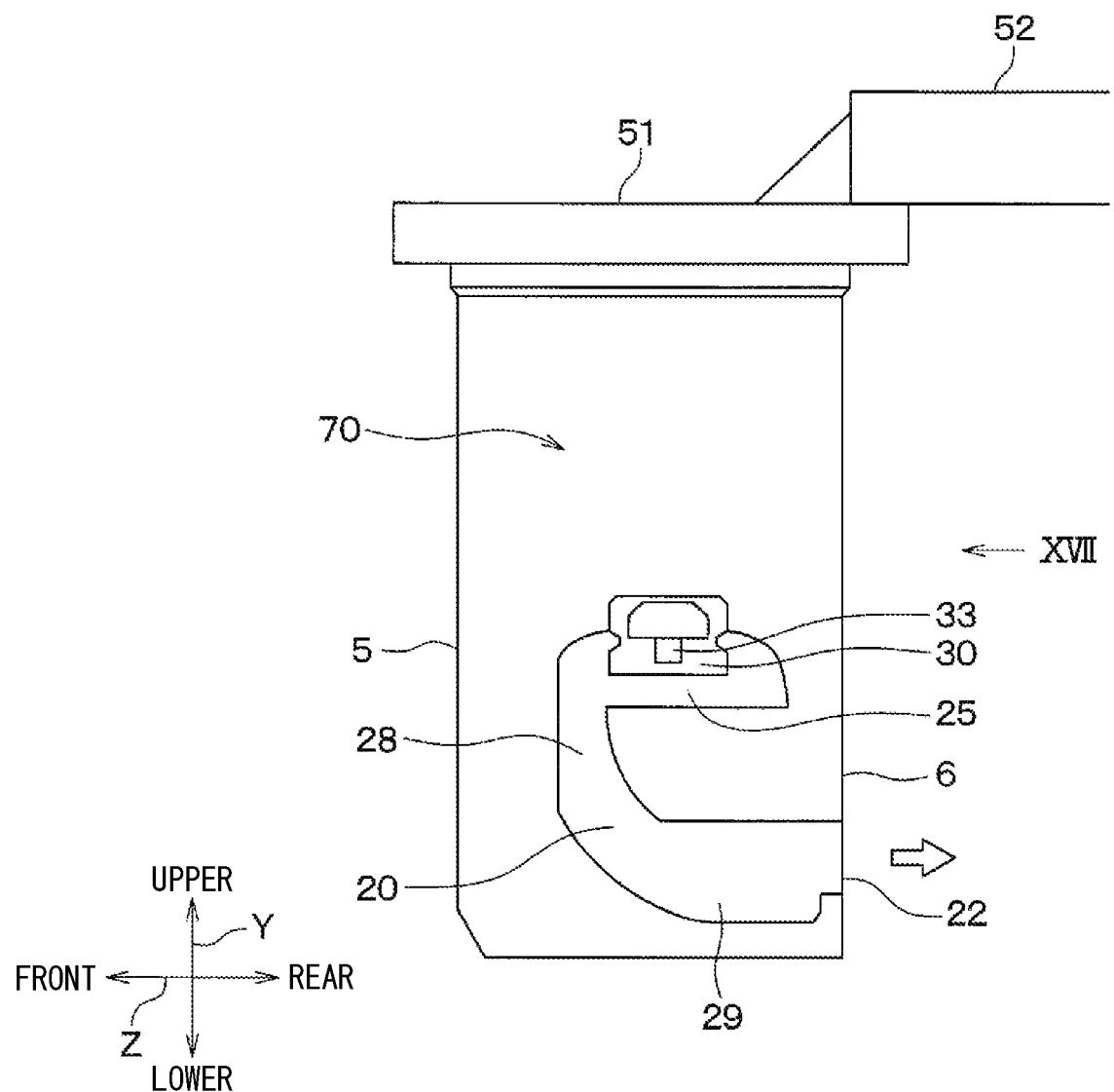
FIG. 19 is a side view showing the air flow meter from which a housing plate is removed when viewed along the XIX direction in FIG. 17.

As shown in FIG. 17, the housing 2 of the third embodiment includes a housing body 70, a first housing plate 71, and a second housing plate 72. The first housing plate 71 and the second housing plate 72 are flat plate-shaped members. FIGS. 18 and 19 show the housing body 70 in a state where the first housing plate 71 and the second housing plate 72 are removed from the housing 2. The housing body 70 is provided with the first sub-passage 10, the second sub-passage 20 and the like.

As shown in FIG. 18, in the third embodiment, the front upper inner wall 13 of the first sub-passage 10 is inclined downward from the first sub-passage inlet 11 toward the first sub-passage outlet 12. The lower inner wall 15 of the first sub-passage 10 is provided substantially parallel to the Z direction. Therefore, a distance D1 of the first sub-passage inlet 11 in the Y direction is formed to be larger than a distance D2 of the first sub-passage outlet 12 in the Y direction.

Further, the inner wall of the housing body 70 in the X direction forming the first sub-passage 10 has the inclined portion 16 at a portion on the rear side of the second sub-passage inlet 21. The inclined portion 16 of the housing body 70 is inclined so as to approach the second housing plate 72 from the front side to the rear side in the Z direction. Therefore, the flow area of the first sub-passage 10 on the rear side of the second sub-passage inlet 21 is gradually reduced toward the first sub-passage outlet 12. As a result, a part of the air flowing through the first sub-passage 10 from the first sub-passage inlet 11 to the first sub-passage outlet 12 is facilitated to flow to the second sub-passage 20.

The second sub-passage 20 has the introduction portion 23 extending to the rear side and diagonally to the upper side from the second sub-passage inlet 21, the folded-back portion 25 extending to the front side from the upper end of the introduction portion 23, a front communication portion 28 extending from a front end of the folded-back portion 25 to the lower side, and a blowout portion 29 extending to the rear side from the lower end of the front communication portion 28. The second sub-passage outlet 22 is provided at the rear end of the blowout portion 29. The flow rate detection unit 30 is provided in the folded-back portion 25 of the second sub-passage 20.

The second sub-passage inlet 21 and the introduction portion 23 of the second sub-passage 20 are shown in FIG. 18, and the folded-back portion 25 is shown in both FIGS. 18 and 19. Further, the front communication portion 28, the blowout portion 29, and the second sub-passage outlet 22 of the second sub-passage 20 are shown in FIG. 19.

As shown in FIGS. 17 and 19, in the third embodiment, the second sub-passage outlet 22 is provided to the rear surface 6 of the housing 2. As shown in FIG. 17, the opening area of the first sub-passage outlet 12 is formed to be smaller than the opening area of the second sub-passage outlet 22.

As shown in FIG. 17, the mold parting mark 40 is formed on the rear surface 6 of the housing 2. In FIG. 17, for convenience of explanation, the mold parting mark 40 is shown by the thick line to distinguish it from other lines. The mold parting mark 40 is formed at a position on the rear surface 6 of the housing 2 away from the inner opening edge 12a of the first sub-passage outlet 12 and at a position away from an inner opening edge 22a of the second sub-passage outlet 22. Further, the mold parting mark 40 is at a position away from the side surface 7.

With this configuration, even when the burr 42 formed on the mold parting mark 40 on the rear surface 6 of the housing 2 is deformed so as to fall toward the first sub-passage outlet 12 or toward the second sub-passage outlet 22, the burr 42 is restricted from protruding toward the first sub-passage outlet 12 or toward the second sub-passage outlet 22. Further, even when the burr 42 formed on the mold parting mark 40 on the rear surface 6 of the housing 2 is deformed so as to fall toward the side surface 7, the burr 42 is restricted from protruding to the outside of the side surface 7. Therefore, the air flow meter 1 of the third embodiment can also restrict deterioration of the detection accuracy and improve the reliability of the detection accuracy similarly to the first embodiment.

Fourth Embodiment

A fourth embodiment will be described. The fourth embodiment is similar to the third embodiment except for a part of the configuration of the housing 2 modified from the corresponding configuration of the third embodiment. Accordingly, only parts different from the corresponding parts of the third embodiment are herein described.

Figure 20:
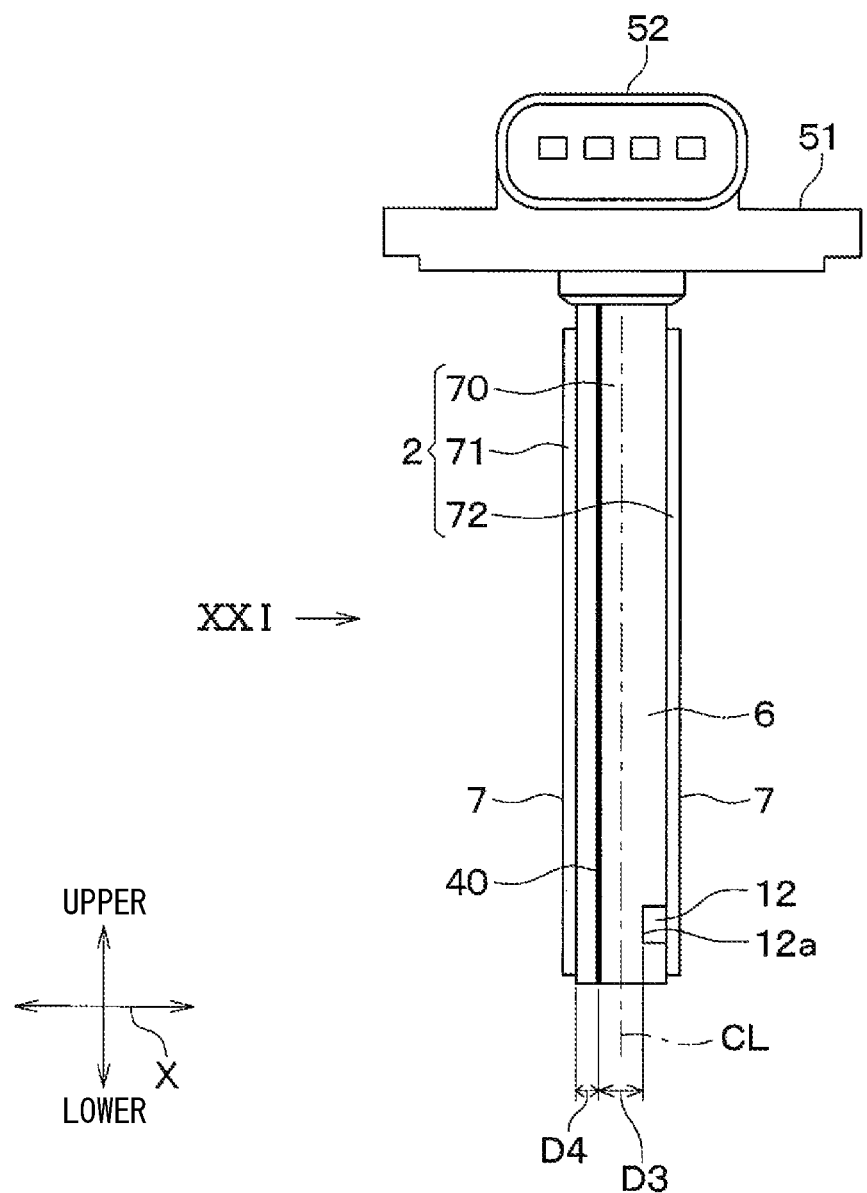
FIG. 20 is a rear view showing an air flow meter of a fourth embodiment.
Figure 21:
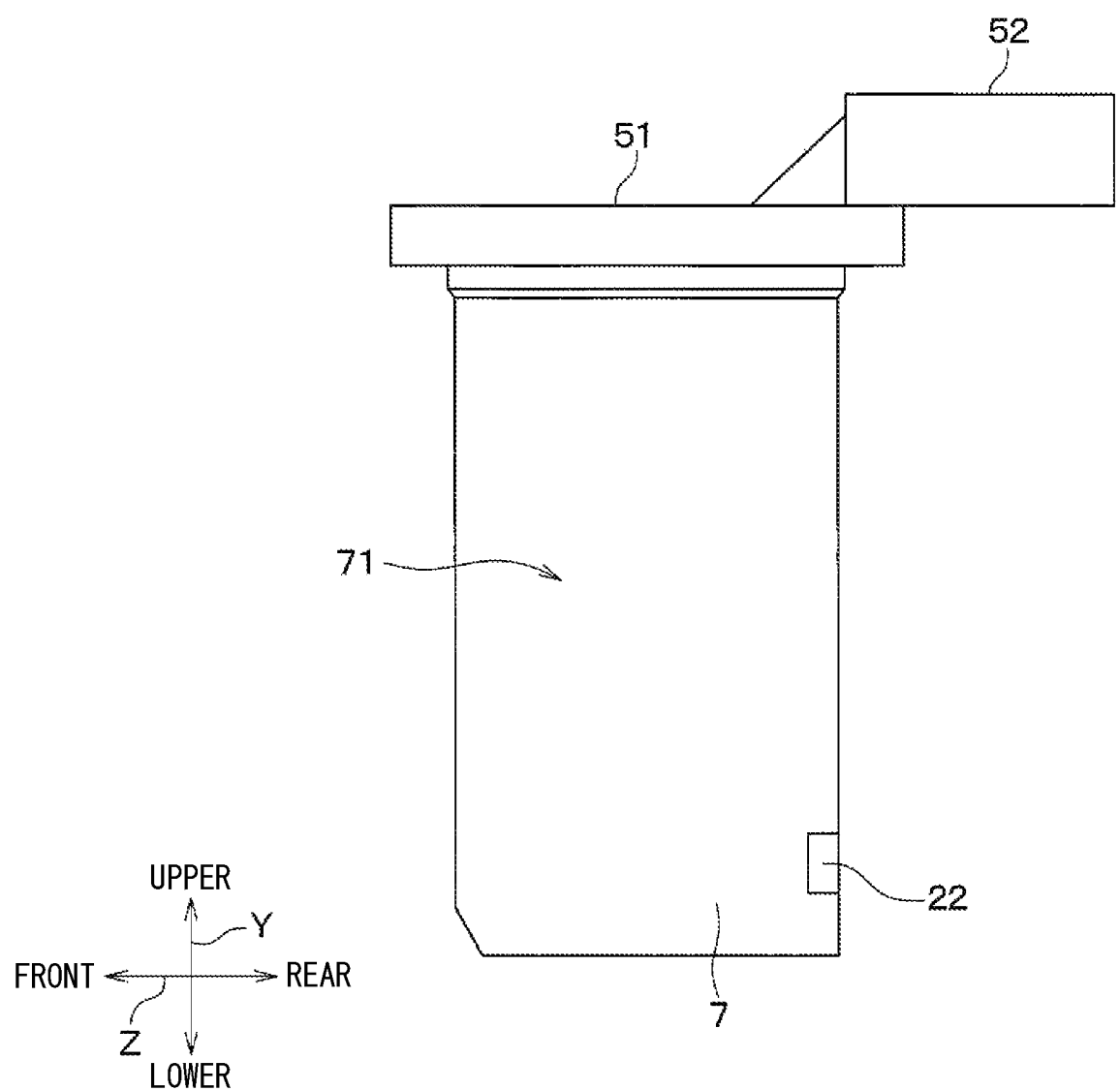
FIG. 21 is a side view showing the air flow meter when viewed along the XXI direction in FIG. 20.

As shown in FIGS. 20 and 21, in the fourth embodiment, the second sub-passage outlet 22 is formed in the side surface 7 of the first housing plate 71. Therefore, the rear surface 6 of the housing 2 is formed with the first sub-passage outlet 12 and is not formed with the second sub-passage outlet 22.

A mold parting mark 40 is formed on the rear surface 6 of the housing 2. In FIG. 20, for convenience of explanation, the mold parting mark 40 is shown by the thick line to distinguish it from other lines. The mold parting mark 40 is formed, in the rear surface 6 of the housing 2, at the position away from the inner opening edge 12a of the first sub-passage outlet 12 and at a position away from the side surface 7. The mold parting mark 40 is formed at the position closer to the first housing plate 71 than the center line CL of the rear surface 6 of the housing 2. That is, a distance D3 between the mold parting mark 40 and the first sub-passage outlet 12 is larger than a distance D4 between the mold parting mark 40 and the first housing plate 71.

The air flow meter 1 of the fourth embodiment as described above can also restrict deterioration of the detection accuracy and improve the reliability of the detection accuracy similarly to the first embodiment.

Other Embodiments

The present disclosure is not limited to the embodiments described above, and can be modified as appropriate. The above embodiments are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. The shape, the positional relationship, and the like of a component or the like mentioned in the above embodiments are not limited to those being mentioned unless otherwise specified, limited to specific shape, positional relationship, and the like in principle, or the like.

(1) In each of the above embodiments, the air flow rate measurement device has been described as being provided in the intake pipe 101 constituting the intake system of the vehicle engine system 100. It is noted that, the configuration is not limited to this. The air flow rate measurement device may be utilized in various purposes as a device installed in a main passage through which air flows to measure the flow rate of air flowing through the main passage.

(2) In each of the above embodiments, the flow rate detection unit 30 included in the air flow rate measurement device has been described as a device that measures the air flow rate with the semiconductor element 33. It is noted that the present configuration is not limited to this. The flow rate detection unit 30 may adopt various configurations such as of a flap type, a heat wire type, and a Karman vortex type.

(3) In each of the above embodiments, the housing 2, the first sub-passage 10, the first sub-passage inlet 11, the first sub-passage outlet 12, the second sub-passage 20, the second sub-passage inlet 21, the second sub-passage outlet 22, and the like may be changed in shape arbitrarily.

Conclusion

According to a first view point shown in part or all of the above-described embodiment, the air flow rate measurement device installed in the main passage through which air flows includes the housing, the first sub-passage, the second sub-passage, the flow rate detection unit, and the mold parting mark. The housing has the front surface arranged on the upstream side of the main passage, the rear surface arranged on the downstream side of the main passage, and the side surfaces connecting the front surface with the rear surface and are formed by injection molding. The first sub-passage is formed in the housing and communicates the first sub-passage inlet in the front surface with the first sub-passage outlet in the rear surface. The second sub-passage communicates the second sub-passage inlet formed in a midway portion of the first sub-passage with the second sub-passage outlet formed at a position different from that of the first sub-passage outlet. The flow rate detection unit is provided in the second sub-passage and outputs a signal according to the flow rate of the air flowing through the second sub-passage. The mold parting mark is on the rear surface 6 of the housing 2 at a position away from the inner opening edge of the first sub-passage outlet.

According to a second view point, the mold parting mark is formed, in the rear surface of the housing, at a position away from the inner opening edge of the first sub-passage outlet and at a position away from the side surface.

With this configuration, even in a case where the burr is formed on the mold parting mark in the rear surface of the housing and where the burr is deformed toward the side surface of the housing, the burr is restricted from protruding outward beyond the side surface. Therefore, the flow of air passing along the side surface of the housing is restricted from being disturbed by the burr, and change in the flow rate of the air flowing out from the first sub-passage outlet is restricted, and therefore, the change in the flow rate of the air flowing through the second sub-passage caused by this is also restricted. Thus, the air flow meter is configured to restrict deterioration of the detection accuracy and to improve a reliability of the detection accuracy even in a case where the burr is formed on the mold parting mark in the rear surface of the housing.

According to a third viewpoint, the front mold parting mark is formed on the front surface of the housing at a position away from the inner opening edge of the first sub-passage inlet.

With this configuration, even in a case where the burr is formed on the front mold parting mark and where the burr is deformed toward the first sub-passage inlet, the burr is restricted from protruding to the first sub-passage inlet. Therefore, the change in the flow rate of the air flowing from the first sub-passage inlet is restricted, and the change in the flow rate of the air flowing through the second sub-passage caused by this is also restricted. Thus, the air flow meter is configured to restrict deterioration of the detection accuracy and to improve a reliability of the detection accuracy even in a case where the burr is formed on the front mold parting mark in the front surface of the housing.

According to a fourth view point, the front mold parting mark is formed, in the front surface of the housing, at a position away from the inner opening edge of the first sub-passage inlet and at a position away from the side surface.

With this configuration, even in a case where the burr is formed on the front mold parting mark and where the burr is deformed toward the side surface of the housing, the burr is restricted from protruding outward beyond the side surface. Therefore, the flow of air passing around the side surface of the housing is restricted from being disturbed by the burr, and change in the flow rate of the air flowing out from the first sub-passage outlet is restricted, and therefore, the change in the flow rate of the air flowing through the second sub-passage caused by this is also restricted. Thus, the air flow meter is configured to restrict deterioration of the detection accuracy and to improve a reliability of the detection accuracy even in a case where the burr is formed on the front mold parting mark in the front surface of the housing.

According to a fifth view point, the second sub-passage outlet is formed in the rear surface of the housing. Further, the mold parting mark is on the rear surface of the housing at a position away from the inner opening edge of the second sub-passage outlet.

With this configuration, even in a case where the burr is formed on the mold parting mark in the rear surface of the housing and where the burr is deformed toward the second sub-passage outlet, the burr is restricted from protruding to the second sub-passage outlet. When the burr protrudes to the second sub-passage outlet, it is considered that the opening area of the second sub-passage outlet is reduced, and the air flow rate of the second sub-passage is reduced. On the other hand, according to the fifth viewpoint, the burr is restricted from protruding to the second sub-passage outlet. Therefore, the change in the flow rate of the air flowing through the second sub-passage is restricted. Thus, the air flow meter is configured to restrict deterioration of the detection accuracy and to improve a reliability of the detection accuracy even in a case where the burr is formed on the mold parting mark.

What is claimed is:

1. An air flow rate measurement device to be installed in a main passage that is configured to cause air to flow therethrough, the air flow rate measurement device comprising:
    a housing having a front surface on an upstream side of the main passage, a rear surface on a downstream side of the main passage, and a side surface connecting the front surface with the rear surface, the housing formed by injection molding;
    a first sub-passage formed in the housing, the first sub-passage communicating a first sub-passage inlet, which is formed in the front surface, with a first sub-passage outlet, which is formed in the rear surface;
    a second sub-passage formed in the housing, the second sub-passage communicating a second sub-passage inlet, which is formed in a midway portion of the first sub-passage, with a second sub-passage outlet, which is formed at a position different from the first sub-passage outlet;
    a flow rate detection unit provided in the second sub-passage and configured to output a signal according to a flow rate of air flowing through the second sub-passage; and
    a mold parting mark formed in the rear surface of the housing at a position that is away from an inner opening edge of the first sub-passage outlet.

2. The air flow rate measurement device according to claim 1, wherein
    the mold parting mark is formed in the rear surface of the housing at a position that is away from the inner opening edge of the first sub-passage outlet and that is away from the side surface.

3. The air flow rate measurement device according to claim 1, further comprising:
    a front mold parting mark formed in the front surface of the housing at a position that is away from an inner opening edge of the first sub-passage inlet.

4. The air flow rate measurement device according to claim 3, wherein
    the mold parting mark is formed in the front surface of the housing at a position that is away from the inner opening edge of the first sub-passage inlet and that is away from the side surface.

5. The air flow rate measurement device according to claim 1, wherein
   the second sub-passage outlet is formed in the rear surface of the housing, and
   the mold parting mark is formed in the rear surface of the housing at a position away from an inner opening edge of the second sub-passage outlet.

* * * * *